United States Patent
Vinegar et al.

(10) Patent No.: US 6,632,047 B2
(45) Date of Patent: Oct. 14, 2003

(54) HEATER ELEMENT FOR USE IN AN IN SITU THERMAL DESORPTION SOIL REMEDIATION SYSTEM

(75) Inventors: Harold J. Vinegar, Houston, TX (US); George L. Stegemeier, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/836,447

(22) Filed: Apr. 16, 2001

(65) Prior Publication Data

US 2002/0018697 A1 Feb. 14, 2002

Related U.S. Application Data

(63) Continuation-in-part of application No. 09/549,902, filed on Apr. 14, 2000, and a continuation-in-part of application No. 09/549,899, filed on Apr. 14, 2000.

(51) Int. Cl.[7] .................................................. A62D 3/00
(52) U.S. Cl. ........................... 405/128.85; 405/128.55; 405/128.15; 405/128.4; 405/128.2; 405/128.3
(58) Field of Search ............................ 392/301; 166/60, 166/61; 405/128.1, 128.15, 128.2, 128.35, 128.4, 128.85, 131

(56) References Cited

U.S. PATENT DOCUMENTS

| | | | |
|---|---|---|---|
| 1,996,708 A | | 4/1935 | Parsons |
| 2,660,249 A | * | 11/1953 | Jakosky ........................ 166/60 |
| 2,714,930 A | * | 8/1955 | Carpenter ..................... 166/60 |
| 3,163,218 A | | 12/1964 | Allen et al. |
| 3,293,863 A | * | 12/1966 | Cox et al. ..................... 111/7.1 |
| 3,507,330 A | * | 4/1970 | Gill ............................. 166/248 |
| 4,010,799 A | * | 3/1977 | Kern et al. ................... 166/248 |

(List continued on next page.)

OTHER PUBLICATIONS

In Situ Thermal Desorption (ISTD) of PCB's, Vinegar et al., HazWaste/World Superfund XVIII; Dec. 1997.*
"Thermal Blanket for In Situ Remediation of Surficial Contamination: A Pilot Test" by Iben et al., from Environmental Science and Technology, vol. 30, No. 11, 1996, pp. 3144–3154.*
Chromalox® brochures on electrical heaters and technical information, from www.chromalox.com: Immersion Heaters–1 page, Spec Sheet Strip heaters #99–060–1 page, SpecSearch Strip Heaters—2 pages; Corrosion Guide for Electric Immersion Heaters1–48–154.*
Chromalox® brochures on electrical heaters and technical information, from www.chromalox.com: Components, pp. A–1—A–12; Chromalox sales ref PA400–5, 99–049, 2 pages; Installation Instructions, 99–028, 2 pgs; Spec Data Sheet for Strip Heaters—3 pgs;.*

(List continued on next page.)

Primary Examiner—J. J. Swann
Assistant Examiner—Katherine Mitchell
(74) Attorney, Agent, or Firm—Meyertons, Hood, Kivlin, Kowert & Goetzel, P.C.; Eric B. Meyertons

(57) ABSTRACT

An in situ thermal desorption (ISTD) soil remediation system may be used to remove or reduce contamination within soil. Heat may be transferred to the soil from resistively heated, bare metal heater elements. The heater elements may be placed directly within the soil. Alternately, the heater elements may be suspended within casings. The heater elements may be conductive heaters, or the heater elements may be radiative heater elements. The ISTD soil remediation system may include temperature-resistant, chemical resistant, flexible conduits that transport off-gas removed from the ground to a treatment facility. A residence time of off-gas within the conduits may be sufficient to allow the off-gas to cool so that the off-gas may pass to a treatment facility through a manifold and piping made of polymeric material.

64 Claims, 18 Drawing Sheets

U.S. PATENT DOCUMENTS

| | | | |
|---|---|---|---|
| 4,185,691 A | * 1/1980 | Tubin et al. | 166/302 |
| 4,654,511 A | * 3/1987 | Horsma et al. | 219/548 |
| 4,716,960 A | * 1/1988 | Eastlund et al. | 166/60 |
| 4,956,535 A | * 9/1990 | Buelt et al. | 166/248 |
| 4,984,594 A | 1/1991 | Vinegar et al. | |
| 4,988,389 A | * 1/1991 | Adamache et al. | 166/105 |
| 5,060,287 A | * 10/1991 | Van Egmond | 166/272.1 |
| 5,076,727 A | 12/1991 | Johnson et al. | |
| 5,114,497 A | 5/1992 | Johnson et al. | |
| 5,169,263 A | 12/1992 | Johnson et al. | |
| 5,190,405 A | 3/1993 | Vinegar et al. | |
| 5,193,934 A | 3/1993 | Johnson et al. | |
| 5,209,604 A | 5/1993 | Chou | |
| 5,221,827 A | 6/1993 | Marsden, Jr. et al. | |
| 5,229,583 A | 7/1993 | van Egmond et al. | |
| 5,233,164 A | 8/1993 | Dicks et al. | |
| 5,244,310 A | 9/1993 | Johnson | |
| 5,261,765 A | * 11/1993 | Nelson | 405/128.6 |
| 5,271,693 A | 12/1993 | Johnson et al. | |
| 5,318,116 A | 6/1994 | Vinegar et al. | |
| 5,330,291 A | * 7/1994 | Heath et al. | 166/248 |
| 5,389,267 A | * 2/1995 | Gorelick et al. | 210/170 |
| 5,433,271 A | * 7/1995 | Vinegar et al. | 166/272.1 |
| 5,553,189 A | 9/1996 | Stegemeier et al. | |
| 5,656,239 A | 8/1997 | Stegemeier et al. | |
| 5,660,500 A | 8/1997 | Marsden, Jr. et al. | |
| 5,664,911 A | * 9/1997 | Bridges et al. | 405/128.4 |
| 5,674,424 A | 10/1997 | Iben et al. | |
| 5,997,214 A | 12/1999 | de Rouffignac et al. | |
| 6,023,554 A | * 2/2000 | Vinegar et al. | 166/60 |
| 6,102,622 A | 8/2000 | Vinegar et al. | |

OTHER PUBLICATIONS

Cost and performance Report In–Situ Thermal Desorption at The Former Mare Island Naval Shipyard, Nov. 1999, prepared by NFESC.*

Stegemeier, Design Equations for In Situ Thermal Desporption, Jan. 19, 1998, 14 pages.*

Bierschenk, In Situ Thermal Desorption Summary of Technology &Application for MGP Sites, 26 pages, Terra Therm, Inc.,, Undated.*

Innovations in GroundWater and Soil Cleanup: From Concept to Commercialization (1997) Chapter 3, pp. 80, 152, and 164, Downloaded from the internet °URL www.nap.edu/openbook/0309063582/html/80.html<.*

Vinegar et al., "Remediation of Deep Soil Contamination using Thermal Vacuum Wells," © 1997 Society of Petroleum Engineers, pp. 905–918.

Vinegar et al., "In Situ Thermal Desorption of Soils Impacted with Chlorinated Solvents," Jun. 1999, 23 pgs.

Vinegar et al., "In Situ Thermal Desorption using Thermal Wells and Blankets," May 1998, 1 pg.

Conley et al., "In Situ Thermal Desorption of Refined Petroleum Hydrocarbons from Saturated Soil," May 2000, pp. 1–10.

Hansen et al., "In Situ Thermal Desorption of Coal Tar," Dec. 1998, pp. 1–22.

* cited by examiner

HEATER ELEMENT FOR USE IN AN IN SITU THERMAL DESORPTION SOIL REMEDIATION SYSTEM

PRIORITY CLAIM

This patent application is a continuation-in-part of U.S. patent application Ser. No. 09/549,902 to Vinegar et al., filed Apr. 14, 2000, and a continuation-in-part of U.S. patent application Ser. No. 09/549,899 to Vinegar et al., filed Apr. 14, 2000.

BACKGROUND OF THE INVENTION

1. Field of the Invention

The present invention relates generally to soil remediation. An embodiment of the invention relates to a heater element for raising soil temperature during an in situ thermal desorption soil remediation process.

2. Description of Related Art

Contamination of subsurface soils has become a matter of concern in many locations. Subsurface soil may become contaminated with chemical, biological, and/or radioactive contaminants. Contamination of subsurface soil may occur in a variety of ways. Material spills, leaking storage vessels, and landfill seepage of improperly disposed of materials are just a few examples of the many ways in which soil may become contaminated. Contaminants in subsurface soil can become public health hazards if the contaminants migrate into aquifers, into air, or into a food supply. Contaminants in subsurface soil may migrate into the food supply through bio-accumulation in various species that are part of a food chain.

There are many methods to remediate contaminated soil. "Remediating contaminated soil" refers to treating the soil to remove soil contaminants or to reduce contaminants within the soil to acceptable levels. A method of remediating a contaminated site is to excavate the soil and to process the soil in a separate treatment facility to eliminate or reduce contaminant levels within the soil. Many problems associated with the method may limit the effectiveness and use of the method. For example, one problem associated with the method is that excavation may generate dust that exposes the surrounding environment and workers to the soil contamination. Also, many tons of soil may need to be excavated to effectively treat even a small contamination site. Equipment cost, labor cost, transport cost, and treatment cost may make the method prohibitively expensive as compared to other available soil remediation methods.

Biological treatment and in situ chemical treatment may also be used to remediate soil. Biological and/or chemical treatment may involve injecting material into the soil. A material injected during a chemical treatment may be a reactant configured to react with the soil contamination to produce non-contaminated reaction products or volatile products that may be easily removed from the soil. The material injected during a chemical treatment may be a flooding agent configured to drive the contamination toward a production well that removes the contaminant from the soil. The flooding agent may be steam, carbon dioxide or other fluid. Soil heterogeneity and other factors may inhibit reduction of contaminant levels in the soil using biological treatment and/or chemical treatment to levels required by governmental regulations.

A process that may be used to remove contaminants from subsurface soil is a soil vapor extraction (SVE) process. An SVE process applies a vacuum to the soil to draw air and vapor through subsurface soil. The vacuum may be applied at a soil/air interface, or the vacuum may be applied through vacuum wells placed within the soil. The air and vapor may entrain and carry volatile contaminants towards the source of the vacuum. Off-gas removed from the soil by the vacuum may include contaminants that were within the soil. The off-gas may be transported to a treatment facility. The off-gas removed from the soil may be processed in the treatment facility to eliminate, or reduce contaminants within the off-gas to acceptable levels. An SVE process may allow contaminants to be removed from soil without the need to move or significantly disturb the soil. An SVE process may operate under roads, foundations, and other fixed structures.

The permeability of the subsurface soil may limit the effectiveness of an SVE process.

Air and vapor may flow through subsurface soil primarily through high permeability regions of the soil. The air and vapor may bypass low permeability regions of the soil. Air and vapor bypassing of low permeability regions may allow large amounts of contaminants to remain in the soil after an SVE process has treated the soil. Reduced air permeability due to water retention, stratified soil layers, and material heterogeneities within the soil may limit the effectiveness of an SVE soil remediation process.

Reduced air permeability due to water retention may inhibit contact of the flowing air with the contaminants in the soil. A partial solution to the problem of water retention is to dewater the soil. The soil may be dewatered by lowering the water table and/or by using a vacuum dewatering technique. These methods may not be effective methods of opening the pores of the soil to admit airflow. Capillary forces may inhibit removal of water from the soil when the water table is lowered. Lowering the water table may result in moist soil. Air conductivity through moist soil is limited.

A vacuum dewatering technique may have practical limitations. The vacuum generated during a vacuum dewatering technique may diminish rapidly with distance from the dewatering wells. The use of a vacuum dewatering technique may not result in a significant improvement to the soil water retention problem. The use of a vacuum dewatering technique may result in the formation of preferential passageways for air conductivity located adjacent to the dewatering wells.

Many types of soil are characterized by horizontal layering with alternating layers of high and low permeability. A common example of a layered type of soil is lacustrine sediments. Thin beds of alternating silty and sandy layers characterize lacustrine sediments. If an SVE well intercepts several such layers, nearly all of the induced airflow occurs within the sandy layers and bypasses the silty layers.

Heterogeneities may be present in subsurface soil. Air and vapor may preferentially flow through certain regions of heterogeneous soil. Air and vapor may be impeded from flowing through other regions of heterogeneous soil. For example, air and vapor tend to flow preferentially through voids in poorly compacted fill material. Air and vapor may be impeded from flowing through overly compacted fill material. Buried debris within fill material may also impede the flow of air through subsurface soil.

In situ thermal desorption (ISTD) may be used to increase the effectiveness of an SVE process. An ISTD soil remediation process involves in situ heating of the soil to raise the temperature of the soil while simultaneously removing off-gas from the soil. Heating the soil may result in removal of contaminants by a number of mechanisms in addition to entrainment of contaminants in an air stream. Such mechanisms may include, but are not limited to: vaporization and vapor transport of the contaminants from the soil; entrainment and removal of contaminants in water vapor; and thermal degradation or conversion of contaminants by pyrolysis, oxidation or other chemical reactions within the soil. In situ heating of the soil may greatly increase the effectiveness of an SVE process.

An ISTD soil remediation process may offer significant advantages over SVE processes and processes that inject drive fluids or chemical and/or biological reactants into the soil. Fluid flow conductivity of an average soil may vary by a factor of $10^8$ throughout the soil due in part to soil heterogeneities and water within the soil. Uniform mass transport through the soil may be a limiting factor in the remediation of a treatment site using an SVE process or a chemical and/or biological treatment of the soil. Thermal conductivity of an average soil may vary by a factor of about two throughout the soil. Injecting heat throughout soil may be significantly more effective than injecting a fluid through the same soil. Heating soil may result in an increase in the permeability of the soil. Heat transferred into the soil may dry the soil. As the soil dries, microscopic and macroscopic permeability of the soil may increase. The increase in permeability of heated soil may allow an ISTD soil remediation process to efficiently remediate the soil throughout a treatment area. The increase in soil permeability may allow in situ remediation of low permeability clays and silts that are not amenable to standard soil vapor extraction processes.

Heat added to contaminated soil may raise the temperature of the soil above vaporization temperatures of contaminants within the soil. If the soil temperature exceeds the vaporization temperature of a soil contaminant, the contaminant may vaporize. Vacuum applied to the soil may be able to draw the vaporized contaminant out of the soil. Even heating the soil to a temperature below vaporization temperatures of the contaminants may have beneficial effects. Increasing the soil temperature may increase vapor pressures of the contaminants in the soil and allow an air stream to remove a greater portion of the contaminants from the soil than is possible at lower soil temperatures.

Most soil includes a large amount of liquid water as compared to contaminants. Raising soil temperature above a vaporization point of water at soil conditions may vaporize water within the soil. The water vapor (steam) may volatize and/or entrain contaminants. Vacuum applied to the soil may remove the volatized and/or entrained contaminants from the soil. Steam vaporization and entrainment of contaminants may result in the removal of medium and high boiling point contaminants from the soil.

In addition to allowing greater removal of contaminants from soil, increasing temperature of the soil may result in the destruction of contaminants in situ. The presence of an oxidizer, such as air, may result in the oxidation of contaminants that pass through high temperature soil. In the absence of oxidizers, contaminants within the soil may be altered by pyrolysis. "Pyrolysis" refers to chemical change brought about by the action of heat. Vacuum applied to the soil may remove reaction products from the soil.

An ISTD soil remediation system may include four major systems. The systems may be a heating and vapor extraction system, an off-gas collection piping system, an off-gas treatment system, and instrumentation and power control systems.

A heating and vapor extraction system may be formed of wells inserted into the soil for deep soil contamination or of thermal blankets for shallow soil contamination. A combination of wells and thermal blankets may also be used. For example, thermal blankets may be placed at centroids of groups of wells. The thermal blankets may inhibit condensation of contaminants near the soil surface. Soil may be heated by a variety of methods. Methods for heating soil include, but are not limited to, heating substantially by thermal conduction, heating by radio frequency heating, or heating by electrical soil resistivity heating. Thermal conductive heating may be advantageous because temperature obtainable by thermal conductive heating is not dependent on an amount of water or other polar substance within in the soil. Soil temperatures substantially above the boiling point of water may be obtained using thermal conductive heating.

Soil temperatures of about 100° C., 200° C., 300° C., 400° C., 500° C. or greater may be obtained using thermal conductive heating.

Heaters may be placed in or on the soil to heat the soil. For soil contamination within about 1 meter of the soil surface, a thermal blanket that is placed on top of the soil may apply conductive heat to the soil. A vacuum may be applied to the soil under the blanket through vacuum ports in the blanket. The heaters may operate at about 870° C. U.S. Pat. No. 5,221,827 issued to Marsden et al. and incorporated by reference as if fully set forth herein, describes a system that uses thermal blankets.

For deeper contamination, wells may be used to supply heat to the soil and to remove vapor from the soil. The term "wells" refers to heater wells, suction wells, and/or combination heater/suction wells. Heater wells supply thermal energy to the soil. Suction wells may be used to remove off-gas from the soil. Suction wells may be connected to an off-gas collection piping system. A suction well may be coupled to a heater well to form a heater/suction well. In a region adjacent to a heater/suction well, air and vapor flow within the soil may be counter-current to heat flow through the soil. The heat flow may produce a temperature gradient within the soil.

The counter-current heat transfer relative to mass transfer may expose air and vapor that is drawn to a vacuum source to high temperatures as the air and vapor approaches and enters the heater/suction well. A significant portion of contaminants within the air and vapor may be destroyed by pyrolysis and/or oxidation when the air and vapor passes through high temperature zones surrounding and in heater/suction wells. In some ISTD systems, only selected wells may be heater/suction wells. In some ISTD systems, heater wells may be separate from the suction wells. Heaters within heater wells and within heater/suction wells typically operate in a range from about 650° C. to about 870° C.

Thermal conductive heating of soil may include radiatively heating a well casing, which conductively heats the surrounding soil. Coincident or separate source vacuum may be applied to remove vapors from the soil. Vapor may be removed from the soil through production wells. U.S. Pat. No. 5,318,116 issued to Vinegar et al., which is incorporated by reference as if fully set forth herein, describe ISTD processes for treating contaminated subsurface soil with thermal conductive heating applied to soil from a radiantly heated casing. The heater elements are commercial nichrome/magnesium oxide tubular heaters with Inconel 601 sheaths operated at temperatures up to about 1250° C. Alternatively, silicon carbide or lanthanum chromate "glowbar" heater elements, carbon electrodes, or tungsten/quartz heaters could be used for still higher temperatures. The heater elements may be tied to a support member by banding straps.

Wells may be arranged in a number of rows and columns. Wells may be staggered so that the wells are in a triangular pattern. Alternately, the wells may be aligned in a rectangular pattern, pentagonal pattern, hexagonal pattern or higher order polygonal pattern. In certain well pattern embodiments, a length between adjacent wells is a fixed distance so that a polygonal well pattern is a regular well pattern, such as an equilateral triangle well pattern or a square well pattern. In other well pattern embodiments, spacing of the wells may result in non-regular polygonal well patterns. A spacing distance between two adjacent wells may range from about 1 meter to about 13 meters or more. A typical spacing distance may be from about 2 meters to about 4 meters.

Wells inserted into soil may be production wells, injection wells and/or test wells. A production well may be used to remove off-gas from the soil. The production well may include a perforated casing that allows off-gas to pass from the soil into the production well. The perforations in the casing may be, but are not limited to, holes and/or slots. The perforations may be screened. The casing may have several perforated zones at different positions along a length of the casing. When the casing is inserted into the soil, the perforated zones may be located adjacent to contaminated layers of soil. The areas adjacent to perforated sections of a casing may be packed with gravel or sand. The casing may be sealed to the soil adjacent to non-producing layers to inhibit migration of contaminants into uncontaminated soil. A production well may include a heating element that allows heat to be transferred to soil adjacent to the well.

In some soil remediation processes, it may be desirable to insert a fluid into the soil. The fluid may be, but is not limited to, a heat source such as steam, a solvent, a chemical reactant such as an oxidant, or a biological treatment carrier. A fluid, which may be a liquid or gas, may be inserted into the soil through an injection well. The injection well may include a perforated casing. The injection well may be similar to a production well except that fluid is inserted into the soil through perforations in the well casing instead of being removed from the soil through perforations in the well casing.

A well may also be a test well. A test well may be used as a gas sampling well to determine location and concentration of contaminants within the soil. A test well may be used as a logging observation well. A test well may be an uncased opening, a cased opening, a perforated casing, or combination cased and uncased opening.

A wellbore for a production well, injection well or test well may be formed by augering a hole into the soil. Cuttings made during the formation of the augered hole may have to be treated separately from the remaining soil. Alternately, a wellbore for a production well, injection well or test well may be formed by driving and/or vibrating a casing or insertion conduit into the soil. U.S. Pat. No. 3,684,037 issued to Bodine and U.S. Pat. No. 6,039,508 issued to White describe devices for sonically drilling wells. Both of these patents are incorporated by reference as if fully set forth herein.

A covering may be placed over a treatment area. The covering may inhibit fluid loss from the soil to the atmosphere, heat loss to the atmosphere, and fluid entry into the soil. Heat and vacuum may be applied to the cover. The heat may inhibit condensation of contaminants on the covering and in soil adjacent to the covering. The vacuum may remove vaporized contaminants from the soil adjacent to a soil/air interface to an off-gas treatment system.

An off-gas collection piping system may be connected to suction wells of a heating and vapor extraction system. The off-gas collection piping system may also be connected to an off-gas treatment system so that off-gas removed from the soil may be transported to the treatment system. Typical off-gas collection piping systems are made of metal pipe. The off-gas collection piping may be un-heated piping that conducts off-gas and condensate to the treatment facility. Alternately, the off-gas collection piping may be heated piping that inhibits condensation of off-gas within the collection piping. The use of metal pipe may make a cost of a collection system expensive. Installation of a metal pipe collection system may be labor and time intensive.

Off-gas within a collection piping system may be transported to an off-gas treatment system. The treatment system may include a vacuum system that draws off-gas from the soil. The treatment system may also remove contamination within the off-gas to acceptable levels. The treatment facility may include a reactor system, such as a thermal oxidizer, to eliminate contaminants or to reduce contaminants within the off-gas to acceptable levels. Alternately, the treatment system may use a mass transfer system, such as passing the off-gas through activated carbon beds, to eliminate contaminants or to reduce contaminants within the off-gas to acceptable levels. A combination of a reactor system and a mass transfer system may also be used to eliminate contaminants or to reduce contaminants within the off-gas to acceptable levels.

Instrumentation and power control systems may be used to monitor and control the heating rate of the heater system. The instrumentation and power control system may also be used to monitor the vacuum applied to the soil and to control of the operation of the off-gas treatment system. Electrical heaters may require controllers that inhibit the heaters from overheating. The type of controller may be dependent on the type of electricity used to power the heaters. For example, a silicon controlled rectifier may be used to control power applied to a heater that uses a direct current power source, and a zero crossover electrical heater firing controller may be used to control power applied to a heater that uses an alternating current power source.

A barrier may be placed around a region of soil that is to be treated. The barrier may include metal plates that are driven into the soil around a perimeter of a contaminated soil region.

A top cover for the soil remediation system may be sealed to the barrier. The barrier may limit the amount of air and water drawn into the treatment area from the surroundings. The barrier may also inhibit potential spreading of contamination from the contaminated region to adjacent areas.

SUMMARY OF THE INVENTION

An ISTD soil remediation process may be used to treat a region of contaminated soil. The process may be implemented using system components that are readily available, relatively inexpensive, and easy to install. The process may be implemented using heaters, a collection piping system, a control system, and a treatment facility. System components of the process may be made of readily available materials. The process may be easy to install, control and operate as compared to conventional ISTD soil remediation processes.

Heaters for an ISTD soil remediation process may include electrical resistance heater elements. In certain embodiments of soil remediation systems, heater elements used to heat soil may be structurally self-supporting, bare metal, radiant heating elements that are suspended within a casing or within an opening in the soil. In certain embodiments of soil remediation systems, heater elements may be structurally self-supporting members, conductive heating elements that are placed within a formation or within a casing. Bare metal heaters may advantageously be readily available. Also, using bare metal heaters may advantageously eliminate cost and installation time associated with buying and installing supporting members for heater wells.

Heater sections of the heater elements may be formed of high temperature, chemical resistant metal if the heater sections are to be exposed to off-gas during soil remediation. Alternately, the heater elements may be formed of less expensive, less chemically resistant metal if the heater element is enclosed in a heater element casing. The heater section dissipates heat when the heater element is connected to a power source. The metal that forms the heater section may be, but is not limited to, stainless steel, Incoloy®, or Nichrome®. The specific metal used to form the heater section of a strip heater may be chosen based on cost, temperature of the soil remediation process, electrical properties of the metal, physical properties of the metal, chemical resistance properties of the metal, and other factors. Heater elements of an ISTD soil remediation system may be formed, or partially formed, from materials having resistivity properties allowing for self regulation of heat generated by the heater element. The use of a self regulating heater element may advantageously obviate the need for controllers for the heaters of the ISTD soil remediation system.

Heater elements may be configured to conductively heat surrounding material. The surrounding material may be soil and/or packing material. A heater section of a conductive heater element may be bare metal. The heater element may be allowed to thermally expand upwards when heated. The conductive heater element may be directly driven into the soil. Fill material may be used to pack the heater element within the casing. In an embodiment, the heater element is a metal strip that is sonically or mechanically driven into the soil to form a "U" shape. A vacuum well casing may be placed between legs of the heater element. In alternate embodiments, heater elements and/or vacuum well casings may be placed within drilled openings in the soil. In other embodiments, heater elements may be placed within trenches formed in the soil. A space between legs of the heater element and/or the vacuum well casing may be packed with sand, gravel, or other packing material.

A conductive heater element may need to be made of a material having high corrosion resistance at high temperatures because the heater element may come into direct contact with off-gas and other fluid within the soil. Alternatively, a conductive heater element may be packed into a heater casing with sand, gravel, or other packing material. The packing material may conductively transfer heat to the heater element well casing. The heater element casing may transfer heat to additional packing material and/or soil. The packing material may also inhibit the heater element from contacting the heater casing wall. Alternately, electrically insulating spacers may be periodically placed along a length of the heater element to inhibit contact between the heater element and the casing wall, and between legs of the heater element. Compared to conventional radiant heating, a heater strip may operate at a lower temperature for the same power input. The lower operating temperature of the heater element may lengthen a lifetime of a heater element and may increase reliability of the heating system.

A heater section of a conductive heater element may have a large cross section area as compared to a cross sectional area of a conventional radiative heater element. The large cross sectional area of the heater section may result in a smaller electrical resistance for the heater element as compared to conventional radiative heaters of equivalent length. The smaller electrical resistance may allow several strip heaters to be connected in series. The ability to connect several strip heaters in series may greatly simplify wiring requirements for an ISTD soil remediation system. The large cross sectional area of the heater section may also allow a large contact area between the heater section and material placed adjacent to the heater section. The large contact area may promote dissipation of heat produced in the strip heater into surrounding soil.

Fill material for a conductive heating element that is placed directly in the soil may include a catalyst material, such as alumina, that enhances the thermal breakdown of contaminants. A heater/suction well may be formed by inserting a perforated casing between legs of a conductive heating element. Attaching the perforated casing to a vacuum source allows vacuum to remove vapor from the soil as off-gas. Positioning the casing between legs of a U-shaped heater element allows the off-gas to pass through a high temperature zone before being removed from the soil. Passing the off-gas through the high temperature zone may result in thermal degradation of contaminants by oxidation and/or pyrolysis of contaminants within the off-gas.

Heater elements may be configured to radiatively heat a heater casing. A radiative heater element may be bare metal. The heater element may be suspended within a casing or suspended within an opening in the soil to be remediated. The cross sectional area, length and type of metal used to form the radiative heater element may allow for suspension of the heater element without securing the heater element to a support member periodically along a length of the heater element. Suspending a heater element may allow the element to thermally expand downwards when heated. Insulating spacers may be periodically spaced along a length of the heater element to inhibit the heater element from contacting a wall of the casing. The insulating spacers may also inhibit contact between legs of the heater element. A fluid, such as helium, may be placed in the casing to promote conductive heat transfer from the heater element to the casing. The heater casing wall may be textured, blackened, or otherwise treated to increase emissivity of the heater casing. An increased emissivity may improve radiative heat transfer between the heater element and the heater casing.

A conductive or radiative heater element may be formed with a variable cross sectional area, and/or with sections made of material having different resistance properties, so that greater heat dissipation occurs at certain portions of the heater element (sections having a smaller cross sectional area and/or higher electrical resistance) than at other portions of the heater element. A local high heat dissipation section of the heater element may be positioned adjacent to soil that requires extra heat dissipation, such as wet soil or sections of soil adjacent to the top and bottom of the heater element. Areas adjacent to the top and bottom of a heater element may need extra heating to counteract end loss heat effects. Selected portions of a heater element may be formed with sections that have a large cross sectional area. Large cross sectional area sections of a heater element may be placed adjacent to an overburden and/or uncontaminated soil layers.

A heater element casing may be driven into the soil, packed into soil, or packed within a second casing that is placed within the soil. The second casing may be a vacuum well casing. Packing material between the second casing and the heater element casing may be sufficiently porous to allow off-gas to easily flow into and out of an annular space between the heater casing and the vacuum casing. Placing a heater element in a heater element casing may allow the heater element to be made of a relative inexpensive, non-corrosion resistant material because off-gas will not come into direct contact with the heater element. The heater element casing may be made of a material that has sufficient corrosion resistance to resist breakthrough corrosion during the estimated time needed to complete soil remediation.

For low depth soil contamination, heater elements, or heater elements positioned within casings, may be placed within trenches within the contaminated soil. Vacuum drawn on the soil surface and/or vacuum drawn within the soil may be used to remove off-gas from the soil. Forming trenches and placing heater elements within trenches may be less expensive than placing heater elements in the soil by driving, vibrating, or placing the heater elements within drilled openings in the soil. For deeper soil contamination, the heater elements may be vibrated or driven into the soil, or the heater elements may be placed within drilled openings. The heater elements may be substantially vertically positioned with respect to the ground surface, or the heater elements may be positioned in a slanted or arcing orientation within the soil. Coincident or separately positioned vacuum wells may be used to remove off-gas from the soil.

Cased or uncased heater elements may be of any desired cross sectional shape, including, but not limited to, triangular, rectangular, square, hexagonal, ellipsoidal, round, or, ovate. In certain heater element embodiments, radiant heater elements are made of rod stock. In certain heater element embodiments, conductive heater elements are formed of rod stock or bar stock.

Simple geometry and use of common stock material may advantageously result in least a 50% cost reduction in heater element material cost and formation as compared to conventional heater elements. Conductive heater elements placed directly in the soil may advantageously eliminate cost associated with a heater element casing. Heater elements made of material that has self regulating heating characteristics may advantageously eliminate the need for heater element controllers.

Installation costs for conductive heater elements that are directly positioned within the soil may be reduced by 75% or more as compared to installation costs for conventional heater elements. Installation costs for heater/suction wells that include conductive heater elements that are directly placed or packed within the soil may be reduced by 50% or more as compared to installation costs for conventional heater/suction wells. Also, installation time for heater wells or heater/suction wells may be significantly reduced for conductive heater elements that are positioned in the soil as compared to installation time for conventional heater elements or heater/suction wells. For example, placing a cased heater in an augered hole and connecting the heater element to a power source may take about six hours. Directly installing a conductive heater element and connecting the heater to a power source may take about one sixth of an hour.

A collection system may connect suction wells of a soil remediation system to a treatment facility. The collection system may include hoses and a polymer vacuum manifold instead of conventional metal piping. The hoses may be high temperature hoses. The hoses may be, but are not limited to high temperature rubber hoses, high temperature silicone rubber hoses, or coated rubber flexible metal hoses. Collections systems typically operate under vacuum; therefore, the hoses need to have structural strength that inhibits collapse of the hoses. The hoses may be double walled hose or a steel reinforced hose. The vacuum manifold may be plastic piping, such as chlorinated polyvinyl chloride (CPVC) piping. Off-gas passing through a hose has a residence time within the hose due to the length of the hose. The residence time may be sufficiently long to allow the off-gas to cool to a temperature within the working temperature limits of the vacuum manifold piping. A hose may be from about 1 m to over 10 m in length. Longer or shorter lengths may be used to meet specific operational requirements.

Use of a hose and plastic piping collection system may result in lower costs, simplified on-site construction, and lower transportation costs as compared to conventional metal piping collection systems. The hose and plastic piping collection system may not be insulated and heated to prevent condensation of the off-gas. The collection system may use an initial riser and gravity to flow condensed off-gas to a trap or to a treatment facility. An unheated collection system greatly reduces cost, installation time, and operating cost of the collection system. The hose may be rolled into coils for transportation. Plastic piping may be purchased locally near the site. Hose and plastic piping are easily cut to size on-site and are connectable by solvent gluing. The need to have precise positioning of metal pipes is eliminated. Also, hose and plastic piping are lightweight and do not require machinery to lift and position during installation. For soil contaminated with chlorinated compounds, off-gas removed from the soil may contain significant amounts of hydrogen chloride. Off-gas may contain other corrosive chemicals as well. The use of hose and plastic piping may advantageously obviate the need to have expensive, chemically resistant metal piping to handle corrosive off-gas.

A treatment facility processes off-gas from the soil to remove, reduce, concentrate, or otherwise treat contaminants within the off-gas. A treatment facility may also provide vacuum that removes the off-gas from the soil. The treatment facility may include a condenser that separates the off-gas into a liquid stream and a vapor stream. The liquid stream and the vapor stream may be separately processed to remove, reduce or concentrate contaminants. The liquid stream may be treated using a separator and/or an activated carbon bed. The separator may produce an aqueous phase and an organic (hydrocarbon) phase. The vapor stream may be treated using an activated carbon bed and/or an air stripper. Depending on the nature of the soil contamination, a majority of contaminants may be destroyed by pyrolysis and/or oxidation within the soil or within heater/suction wells. The remaining contamination may be concentrated, stored and transported offsite; may be absorbed or adsorbed in mass transfer systems; or may be destroyed on site in a reactor system. Depending on the type of contamination, the reactor system may be a chemical treatment system and/or a thermal treatment system. In some soil remediation system embodiments, a contaminant treatment portion of the treatment facility may only need to operate during an initial start up period when temperatures of heater elements are rising to operation temperatures. After the heating elements reach operating temperatures, the contaminants may be destroyed within the soil or within wells by oxidation and/or pyrolysis.

Previous treatment facilities may have required the use of a thermal oxidizer. Removing the thermal oxidizer from the treatment facility eliminates the large capital cost, transportation costs, and operating expenses associated with the thermal oxidizer. The elimination of the thermal oxidizer may allow the soil remediation process to be run unattended. A site supervisor may periodically check the system and perform normal maintenance functions at the site to ensure proper operation of the soil remediation system. Continuous manned operation of the in situ soil remediation process may not be required.

BRIEF DESCRIPTION OF THE DRAWINGS

Other advantages of the invention will become apparent upon reading the following detailed description and upon reference to the accompanying drawings in which.

Figure 1:
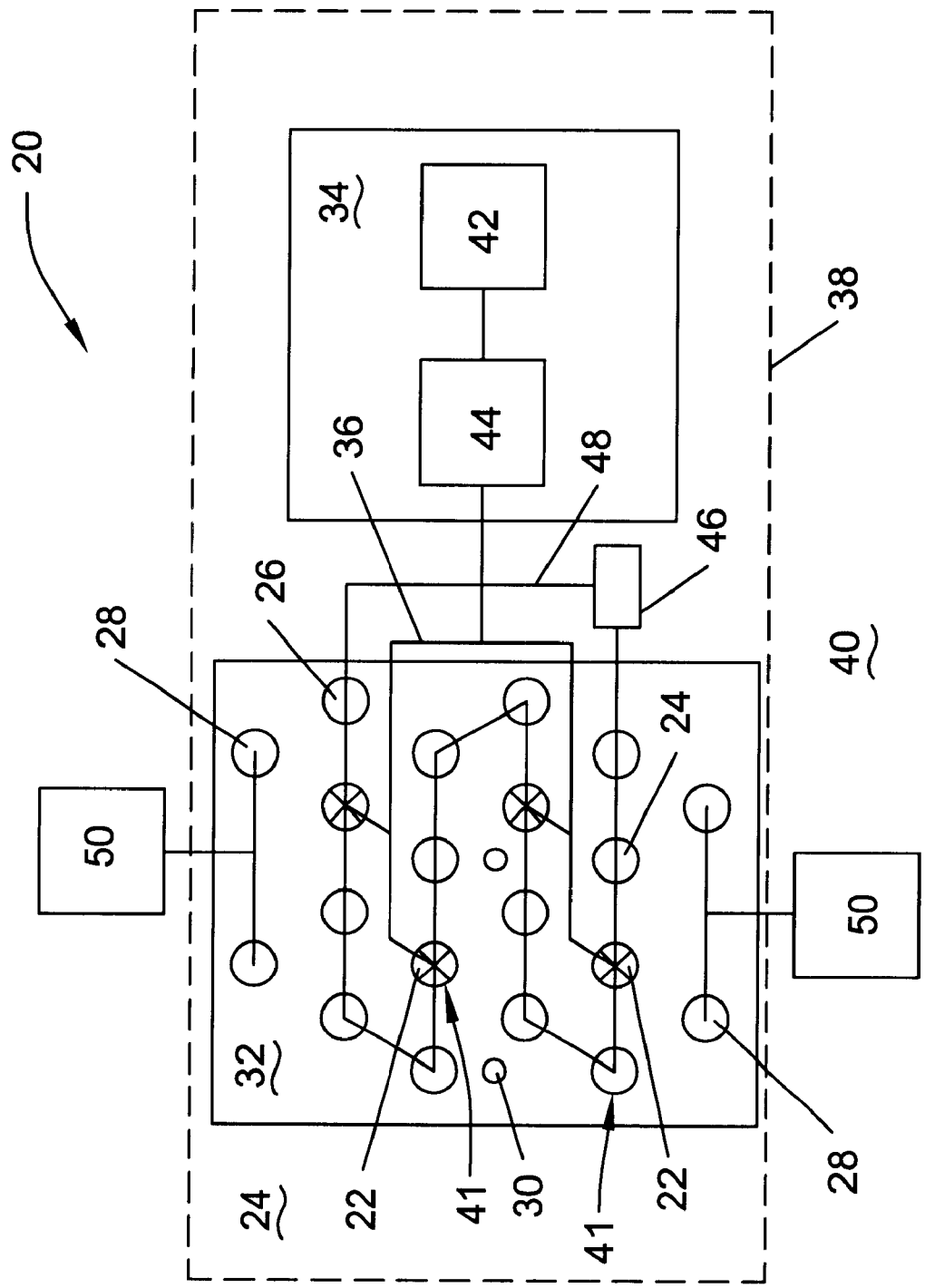
FIG. 1 shows a schematic plan view representation of an embodiment of a soil remediation system.

While the invention is susceptible to various modifications and alternative forms, specific embodiments thereof are shown by way of example in the drawings and will herein be described in detail. The drawings may not be to scale. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
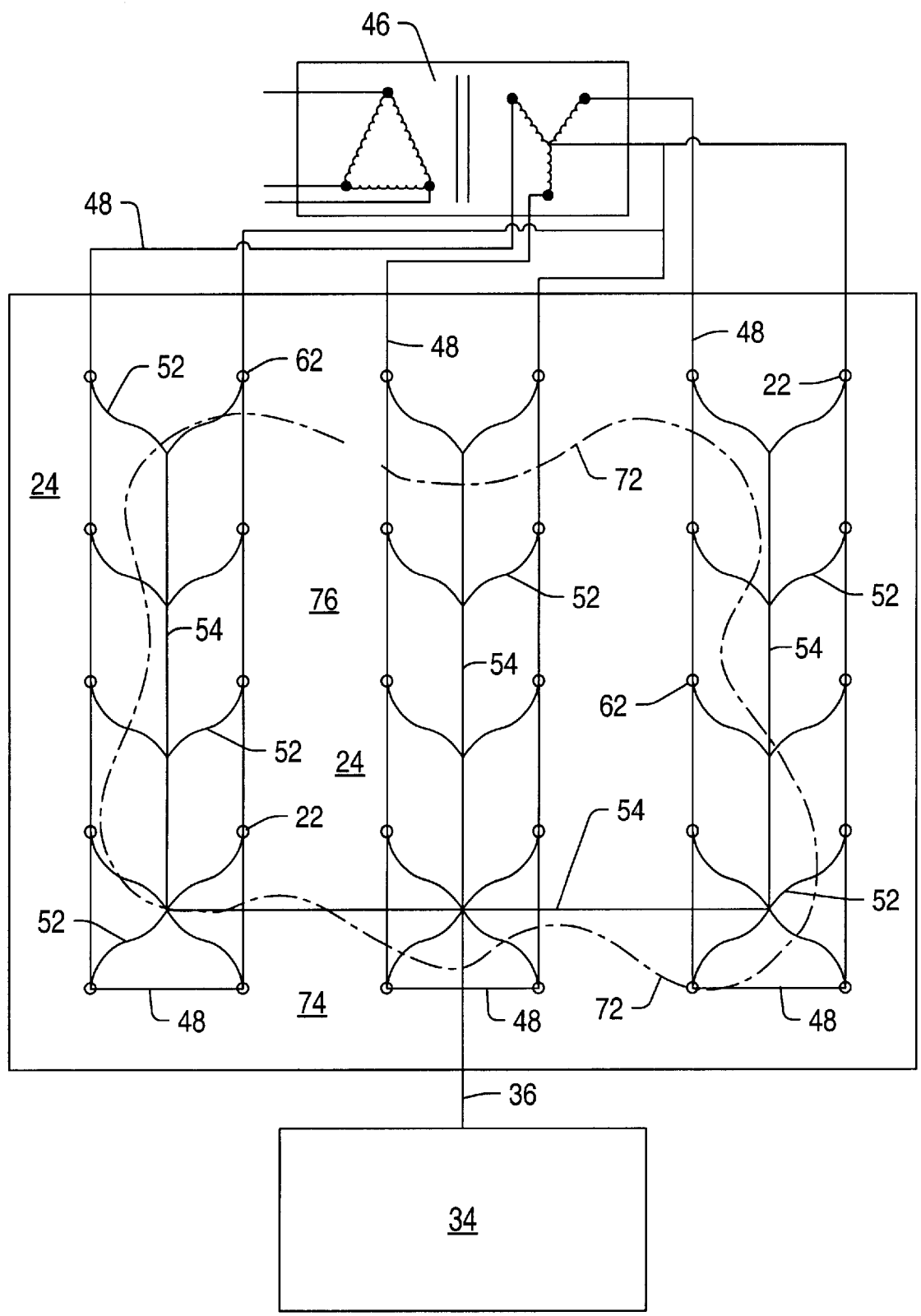
FIG. 2 shows a schematic plan view representation of an embodiment of a soil remediation system.

An in situ thermal desorption (ISTD) soil remediation system may be used to treat contaminated soil. The soil remediation system may remove or reduce contaminants within a selected soil region. FIGS. 1 and 2 show schematic representations of embodiments of ISTD soil remediation systems 20. The soil remediation system 20 depicted in FIG. 1 may include one or more production wells 22 within soil 24. The soil remediation system 20 may optionally include one or more heat injection wells 26, one or more fluid injection wells 28, and one or more test wells 30. Fluid injection wells 28 and/or test wells 30 may be located inside or outside of a pattern of production wells 22 and heat injection wells 26. Production wells 22, heat injection wells 26, fluid injection wells 28 and/or test wells 30 may include well casings. Portions of the well casings may be perforated to allow fluid to pass into or out of the well casings. Alternately, production wells 22, heat injection wells 26, fluid injection wells 28 and/or test wells 30 may include a cased portion and an uncased portion. The uncased portion may be adjacent to contaminated soil.

Dewatering wells around a perimeter of a treatment area may be needed to inhibit water inflow into the treatment area. Dewatering wells may be placed in uncontaminated soil when possible to avoid the need to treat contaminated water produced from the soil. The dewatering wells may be arranged in at least two offset rows. The outermost row of wells may pump substantially clean water from the soil that requires little or no treatment before being discharged. The innermost row of dewatering wells may include some off-gas or condensed off-gas mobilized by the ISTD soil remediation process. Water removed from the innermost row and/or the outermost row of dewatering wells may need to be treated before being discharged. A pressure difference between successive rows of dewatering wells may be maintained as low as possible so that there is no or substantially no flow between the rows. The treatment of water removed by the dewatering wells may involve removing contaminants by mass transfer, by reactions, or by concentrating and/or separating the contaminants. If the soil is treated in sections, dewatering wells initially placed in a portion of soil that is to be decontaminated may be placed in a pattern so that the dewatering wells can be converted to other uses when the ISTD soil remediation process advances to treat the area where the dewatering wells are placed. The dewatering wells may be converted to heat injection wells or production wells.

In addition to production wells 22, heat injection wells 26, fluid injection wells 28 and/or test wells 30, a soil remediation system 20 may include ground cover 32, treatment facility 34, vapor collection system 36, and control system 38. The ground cover 32 may be placed over the production wells 22, heat injection wells 26, fluid injection wells 28 and/or test wells 30 to inhibit heat loss and contaminant vapor loss to the atmosphere. The ground cover 32 may also inhibit excess air from being drawn into the soil 24. The ground cover 32 may include a layer of thermal insulation. The ground cover 32 may include a layer that is impermeable to contaminant vapor and/or air. In an embodiment, the impermeable layer is metal sheet. Wells may be welded or otherwise sealed to the metal sheet. Vertical barriers may be inserted into the soil around a perimeter of the metal sheet to form an end barrier. The thermal insulation may typically be placed above the impermeable barrier. The thermal insulation may be mineral or cotton wool, glass wool or fiberglass, polystyrene foam, or aluminized mylar or other thermally insulating material.

Optional surface heaters may be placed on or below the metal sheet. The surface heaters may inhibit contamination from condensing on the ground cover 32 and flowing back into the soil 24. The surface heaters are typically electrically powered heaters.

A gas and water barrier of the ground cover 32 may be placed over the remediation site.

The gas and water barrier may be plastic sheeting. Any openings or connections to equipment may be sealed with a silicone or other type of sealant.

A ground cover 32 may not be needed if the contamination is so deep within the soil 24 that heating the soil and removing off-gas from the soil will have negligible effect at ground surface 40 of the soil. If a cover is not utilized, a vacuum source may need to draw a vacuum around wellheads 41 of heat injection wells and/or production wells to inhibit release of vapor to the atmosphere from the wells. A wellhead is equipment and/or structure attached to an opening of a well.

A treatment facility 34 may include a vacuum system 42 that draws an off-gas stream from soil 24 through production wells 22. If the soil remediation system includes surface heaters, the vacuum system 42 may be configured to draw vacuum at the ground surface 40 as well as in production wells 22. The vacuum drawn in the production wells 22 may be stronger than the vacuum drawn at the surface 40. The treatment facility 34 may also include a contaminant treatment system 44 for treating contaminants within the off-gas. The contaminant treatment system 44 may eliminate contaminants from the off-gas stream, reduce contaminants to acceptable levels and/or concentrate contaminants for off-site transport. The contaminant treatment system 44 may include, but is not limited to, separators, condensers, reactor systems; mass transfer systems, and chemical storage vessels.

Figure 3:
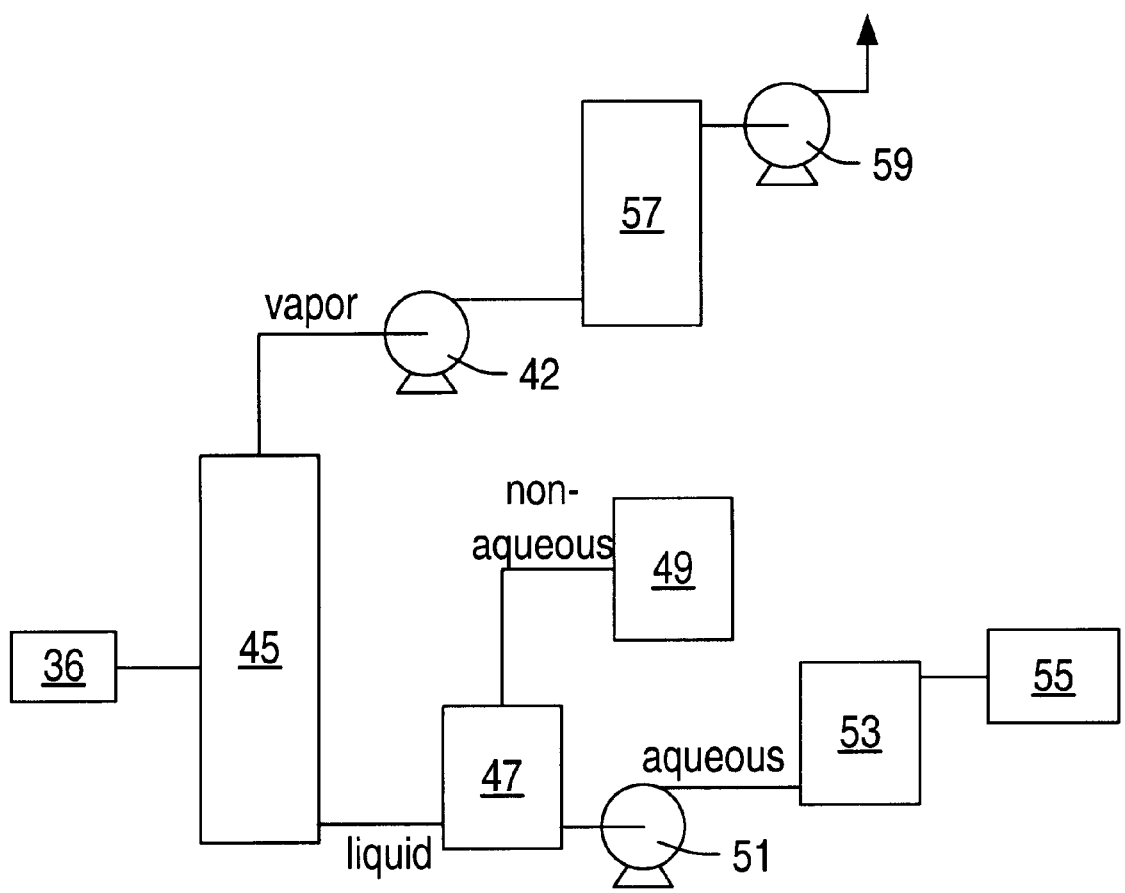
FIG. 3 shows a schematic view of an embodiment of a treatment system for processing off-gas removed from soil.

FIG. 3 shows an embodiment of a treatment system 44. Off-gas from the vapor collection system 36 may pass into separator 45. The separator 45 may separate the off-gas into a liquid stream and a vapor stream. Vacuum system 42 that is in-line with the vapor stream may provide the vacuum to the soil 24 that removes off-gas from the soil. The vacuum system 42 should be capable of pulling a vacuum appropriate for the particular combination of soil permeability and production wells within a treatment system. The vacuum system 42 may be able to pull a vacuum in the range of 0.01 atmospheres to slightly less than 1 atmosphere. The vacuum system may be a water sealed pump.

Liquid and vapor streams may be processed by treatment system 44 to reduce contaminants within the streams to acceptable levels. Monitoring equipment may determine the quantity of contaminants in processed streams. The monitoring equipment may sound an alarm and/or begin recirculation of output streams from the treatment system 44 back to the beginning of the treatment system if too much contamination is detected in the output streams.

A liquid stream may be separated by second separator 47 into a non-aqueous stream and an aqueous stream. In an embodiment, the second separator 47 and the separator 45 may physically be a single unit. The non-aqueous stream may include oils and other non-aqueous material. The non-aqueous stream may be very small compared to the aqueous stream. The non-aqueous stream may be sent to treatment unit 49. The treatment unit 49 may place the non-aqueous stream in storage containers, such as waste barrels. The containers may be transported off-site for disposal. Alternately, the treatment unit 49 may be an oxidization system, thermal system, or other reaction system that eliminates or reduces to acceptable levels contaminants within the non-aqueous stream.

Pump 51 may transport the aqueous stream through activated carbon bed 53. The activated carbon bed 53 removes contaminants from the aqueous stream. The remaining aqueous stream may then be discharged. For example, after passing the aqueous stream through the activated carbon bed 53, the aqueous stream may be sent to sanitary sewer 55.

The vapor stream from the separator 45 may pass through treatment unit 57. The treatment unit 57 may be a mass transfer system such as activated carbon bed, a reactor system such as a thermal oxidizer, or a combination thereof. Blower 59 may draw the vapor stream through the treatment unit 57 and vent the remaining vapor to the atmosphere.

In some embodiments of treatment systems 44, the treatment systems may not include thermal oxidizers to eliminate or reduce contaminants within off-gas to acceptable levels. Carbon beds, concentrators, or non-thermal reactor systems may replace thermal oxidizers. Replacement of thermal oxidizers with other equipment that eliminates or reduces contaminants may lower capital cost, transportation cost, and/or operation costs of an ISTD soil remediation system. A thermal oxidizer may be very expensive to obtain and to transport to treatment locations. Also, thermal oxidizers may require on-site monitoring by operational personnel to ensure that the thermal oxidizer is functioning properly. Removing a thermal oxidizer from a soil remediation process may significantly improve economics of the process.

A vapor collection system 36 may include a piping system that transports off-gas removed from soil 24 to a treatment facility 34. The piping system may be coupled to a vacuum system 42 and to production wells 22. In an embodiment, the piping may be un-heated piping and/or un-insulated piping. Off-gas produced from the soil may initially rise vertically and then travel downwardly to the treatment facility. The initial rise and subsequent downward travel allows any condensed off-gas to pass to a liquid trap or to a separator of the treatment system without blocking lines of the collection system. In alternate embodiments, the piping is thermally insulated and heated. Insulated and heated piping inhibits condensation of off-gas within the piping. Having a non-insulated and non-heated collection system may greatly reduce cost, installation time, and complexity of a soil remediation system.

A control system 38 may be a computer control system. The control system 38 may monitor and control the operation of a treatment facility 34. If the vapor collection system 36 includes heated piping, the control system 38 may control power applied to line tracers that heat the piping. If the production wells 22 or heat injection wells 26 include non-self regulating heater elements, the control system may control power applied to heater elements of the production wells.

Heat may be applied to soil 24 during an ISTD process. Heat may be applied to soil from heat injection wells 26, from production wells 22, and/or from other heat sources. Heat may be applied to soil 24 from electrical resistance heater elements positioned within the production wells. Power may be supplied from power source 46 to the production wells 22 and heat injection wells 26 through cables 48. The power source 46 may be a transformer or transformers that are coupled to high voltage power lines. In some embodiments of soil remediation systems, heat may be applied to the soil by other heat sources in addition to or in lieu of heat being applied from electrical resistance heater elements. Heat may be applied to soil, but is not limited to being applied to soil, by combustors, by transfer of heat with a heat transfer fluid, by radio frequency or microwave heating, and/or by soil resistivity heating.

Production wells 22 depicted in FIG. 1 are heater/suction wells. Heat generated by electrical resistance heaters within the production wells 22 apply heat to soil. Heat generated by heater elements within the production wells 22 flows countercurrent to mass flow of off-gas within the soil 24. The countercurrent flow of heat and mass may allow the off-gas to be exposed to high temperatures adjacent to and in the production wells 22. The high temperatures may destroy a significant portion of contaminants within the off-gas. In other embodiments of soil remediation systems, some of the production wells, or all of the production wells, may not include heater elements that heat the soil.

In some soil remediation system embodiments, heat may be applied to the soil only from heater/suction wells. In other embodiments, such as the embodiment depicted in FIG. 1, only selected wells within the soil are heater/suction wells. Using only some heater/suction wells may significantly reduce cost of the soil remediation system. Heater/suction wells are typically more expensive than heater wells. Installation and connection time for heater/suction wells is typically more expensive and longer for heater/suction wells than for heater wells. A vapor collection system may need to be much more extensive, and thus more expensive, for a soil remediation system that uses exclusively heater/suction wells.

In some embodiments of soil remediation systems, heat may be provided to the soil 24 from heat injection wells 26 and/or from production wells 22. Heat injection wells 26 are not coupled to vacuum system 42. Superposition of heat from heater elements of heat injection wells 26 and/or production wells 22 may allow a temperature of soil 24 within a treatment area to rise to a desired temperature that will result in remediation of the soil. The production wells 22 may remove off-gas from the soil 24. The off-gas may include contaminants and/or reaction products of contaminants that were within the soil 24.

Production wells 22 and heat injection wells 26 may be placed in desired patterns within soil 24 that is to be remediated. The patterns of production wells 22 and heat injection wells 26 may be, but are not limited to, triangular patterns (as shown for production wells 22), rectangular patterns, pentagonal patterns, hexagonal patterns (as shown for heat injection wells 26), or higher order polygon patterns. An actual soil remediation system will typically have many more wells within a treatment area than are depicted in the schematic representation of FIG. 1. The well patterns may be regular patterns to promote uniform heating and off-gas removal throughout a treatment area. For example, well patterns may be equilateral triangle patterns or square well patterns. Production wells 22 and heat injection wells 26 of the patterns may be substantially uniformly placed throughout a treatment area. Some of the production wells 22 and/or heat injection wells 26 may be offset from the regular patterns to avoid obstacles in or on the soil. Obstacles may include, but are not limited to, structures; impermeable, uncontaminated regions amid contaminated soil; property lines; and underground or above ground pipes or electrical lines. Spacing between centers of wells may range from about 1 m to 13 m or more. Spacing may be determined based on time allowable for remediation, soil properties, type of soil contamination and other factors. A close well spacing may require less heating time to raise soil temperature to a desired temperature, but close well spacings may require many more additional wells to heat the soil than would be required with a larger well spacing.

Some soil remediation systems may include fluid injection wells 28. Fluid injection wells 28 may be used to introduce a fluid into the soil 24. The fluid may be, but is not limited to, a reactant, a biological agent, and/or a flooding agent. The fluid may be injected into the soil 24 by pumping units 50. Alternately, vacuum applied to production wells 22 may draw fluid into the soil 24 from fluid injection wells 28.

Some soil remediation systems may include test wells 30. Fluid samples may be withdrawn from test wells 30 to allow determination of the progress of soil remediation at selected locations and at selected times. Monitoring equipment may be positioned in test wells 30 to monitor temperature, pressure, chemical concentration, or other properties during a soil remediation process.

FIG. 2 depicts a representation of an ISTD soil remediation system 20 that uses only heater/suction wells as production wells 22. Power source 46 heat the heater elements within the production wells 22 may be a three phase transformer. For example, the power source 46 may be a 112.5 kVA transformer that has a 480 VAC 3-phase primary and a 208 VAC 3-phase secondary. Each phase may be used to power a group of production wells 22 that are electrically connected in series. If more than three groups of production wells 22 are needed to process a treatment area, sections of the area may be sequentially treated, or additional power sources may be used so that the entire treatment area is processed at one time. The production wells 22 may be directly coupled to the power source 42 without the use of well controllers if the heater elements are made of metals having self regulating temperature properties. The heater elements of the production wells 22 and the power source 46 are designed to reach a desired temperature when connected to the power source. Heater elements may be designed to heat to a maximum temperature of about 1250° C. Heater elements may be designed to have a steady state operating temperature of about 900° C. An operating range of heater elements may extend from ambient soil temperature to about 1250° C.

Off-gas drawn from the soil 24 by vacuum may pass through hoses 52 and vacuum manifold 54 to a treatment facility 34. The hoses 52 and the vacuum manifold 54 may be components of a vapor collection system 36. The hoses 52 may attach to vacuum casings of a production well 22 and to the vacuum manifold 54. The vacuum casing may extend through a covering 32 and may rise to a height sufficient to allow the remainder of the vapor collection system 36 to slope downwards to a treatment facility 34. Sealant such as welds, silicone rubber sealant or other types of sealant, may be used to seal casings of production wells 22 and other structures that pass through the covering 32 to the covering. Seals may inhibit vapor and/or liquid from passing into or out of the covering 32.

A hose 52 may be attached to each production well casing and to the vacuum manifold 54 by solvent glue and/or clamps, or by other attachment methods including, but not limited to, threading or flanges. The hoses 52 may be formed of high temperature rubber that has an upper working temperature limit of about 450° F. The hoses 52 are conduits for transporting off-gas from the production wells 22 to the vacuum manifold 54. Off-gas passing through a hose 52 has a residence time within the hose. A hose 52 may have a sufficient length so that the residence time of off-gas within the hose is sufficiently long to allow the off-gas to cool. The off-gas may cool within the hoses 52 to a temperature that is at or below an upper working temperature limit of the material that forms the vacuum manifold 54.

A vacuum manifold 54 may be formed of plastic piping. The plastic piping may be chlorinated polyvinyl chloride (CPVC) piping or other plastic piping that has a high upper working temperature limit. The upper working temperature limit of CPVC pipe is approximately 200° F. Off-gas flowing through the vacuum manifold 54 may cool. Portions of the vacuum manifold 54 located away from production wells 22 may be formed of plastic piping, such as PVC piping, that has a lower working temperature limit than CPVC piping.

The use of a collection system including hoses 52 and plastic piping vacuum manifold 54 may result in lower costs, simplified on-site construction, and lower mobilization costs as compared to a metal piping collection system. The collection system is not insulated and heated to prevent condensation of the off-gas. This greatly reduces the cost, installation time, and operating cost of the collection system. The hose 52 may be rolled into coils for transportation. Plastic piping may be purchased locally near the site. Hose 52 and plastic piping are easily cut to size on-site and are connectable by solvent gluing or other techniques. Also, hose 52 and plastic piping are lightweight and do not require machinery to lift and position during installation. Unlike some metal piping, hose 52 and the plastic piping may be highly resistant to corrosion caused by the off-gas. For example, off-gas contamination may include hydrogen chloride, especially if the soil contamination includes chlorinated hydrocarbons. If the hydrogen chloride forms hydrochloric acid with condensed water, the acid may rapidly corrode metal vapor collection piping. Hose 52 and plastic pipe may be highly resistant to HCl corrosion.

Figure 4:
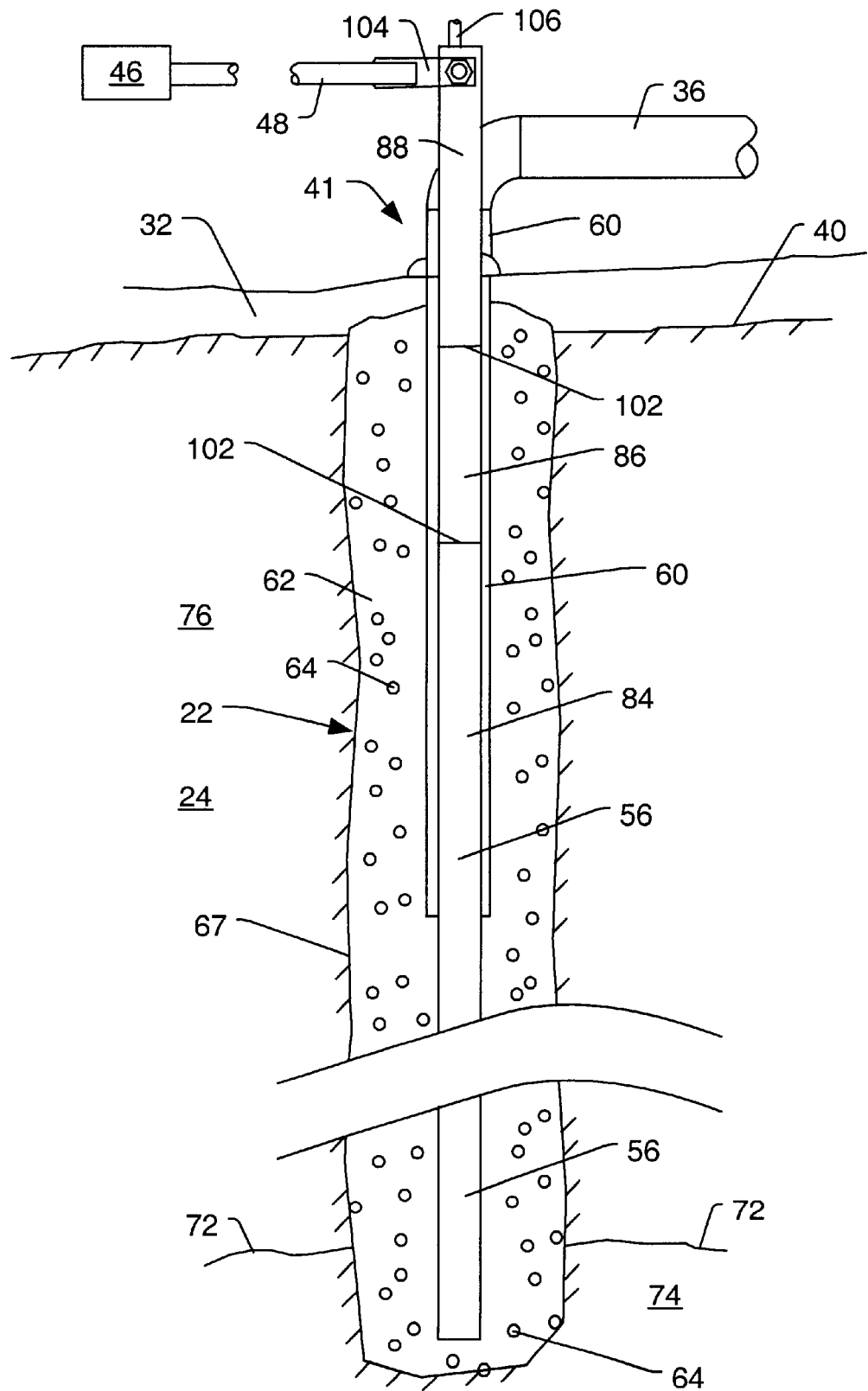
FIG. 4 depicts a side representation of an embodiment of a production well inserted into soil.
Figure 5:
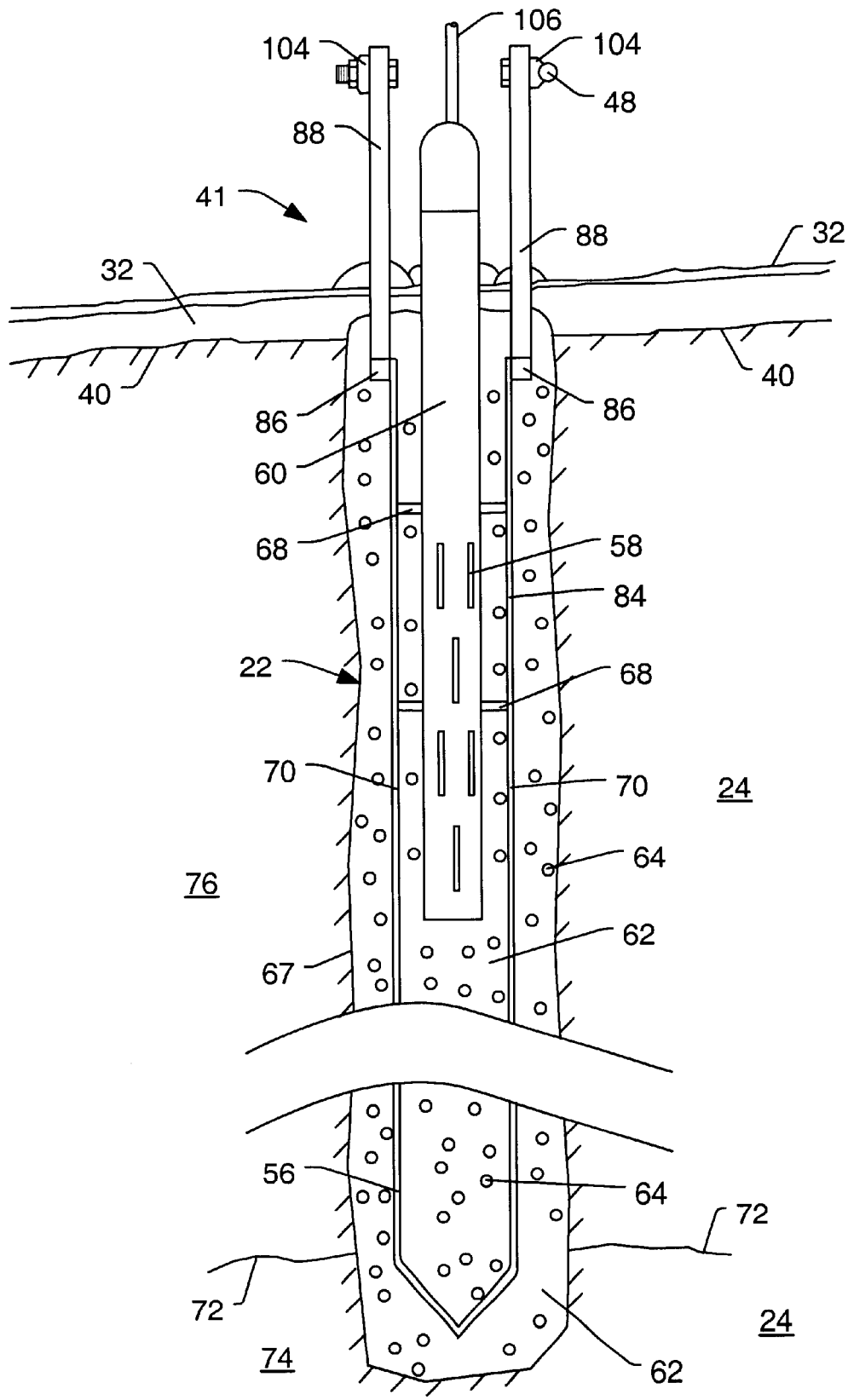
FIG. 5 depicts a front representation of an embodiment of a production well inserted into soil.
Figure 6:
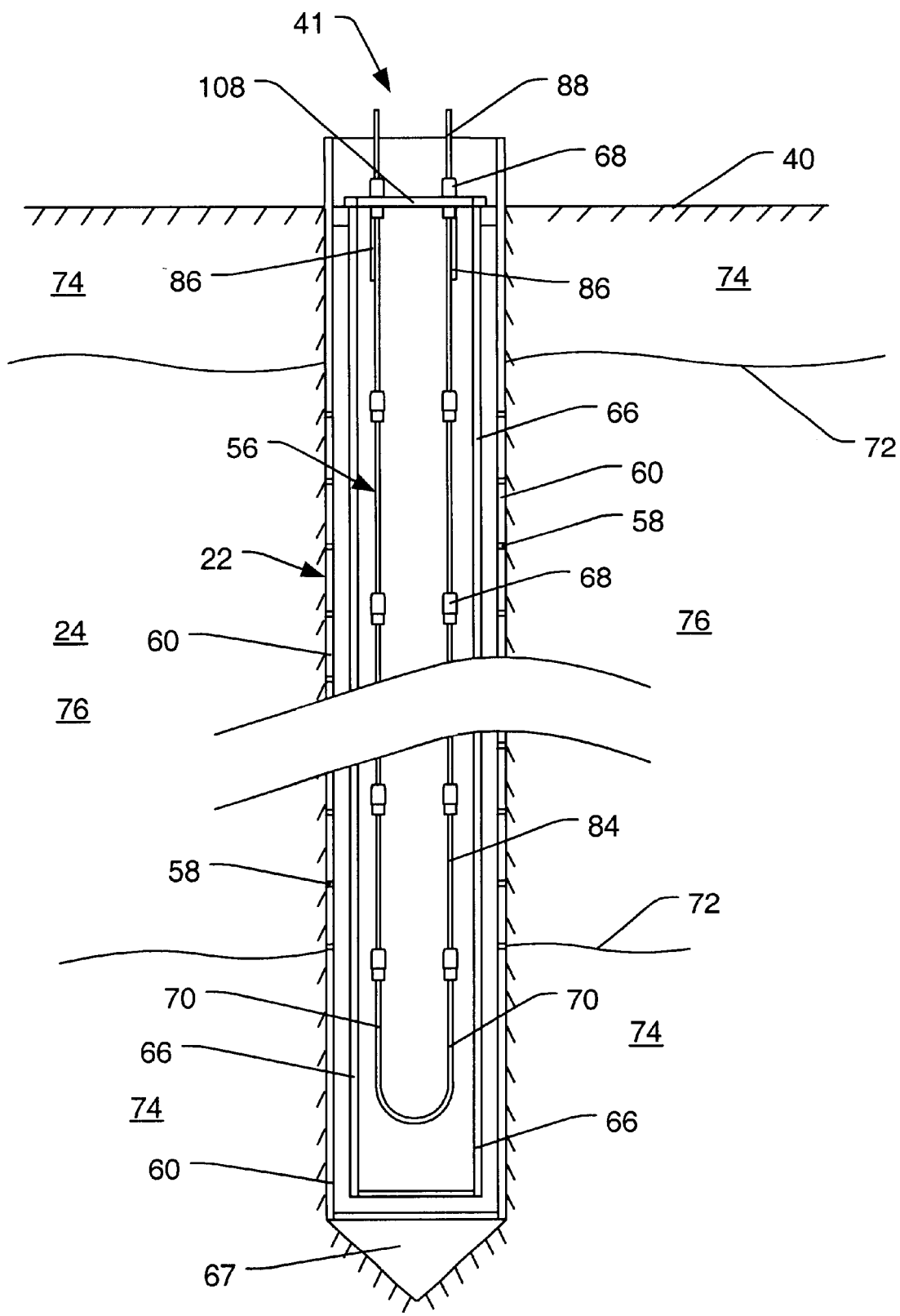
FIG. 6 depicts a representation of an embodiment of a production well with a radiant heater element.

FIGS. 4, 5, and 6 depict embodiments of production wells 22 that include heater elements 56. Heater elements 56 may be bare metal without an insulation coating such as mineral insulation. Using uninsulated, bare metal heater elements may significantly reduce heater cost as compared to conventional heater elements, such as mineral insulated cables. Heater elements 56 may be placed in the soil 24 without being tied to a support member such as a conduit or a support cable. Eliminating a support cable or conduit reduces cost, installation time and labor associated installing the heater element. An electrical current may be passed through heater elements 56 to resistively heat the heater elements.

A vacuum system may remove off-gas from the soil 24 through openings 58 in vacuum casing 60. FIGS. 4 and 5 depict embodiments of production wells that conductively heat the soil 24. The heater elements 56 shown in FIGS. 4 and 5 heat packing material 62 that conducts heat to adjacent soil. The packing material 62 may be sand, gravel, or other fill material that may be subjected to high temperatures. The fill material may include catalyst 64. The catalyst 64 may be a metal, metal oxide, or other type of catalyst that enhances pyrolysis or oxidation of contaminants that pass through the packing material. In an embodiment, the catalyst is alumina.

Heater elements that are packed with fill material in the soil may thermally expand towards the surface when heated. Allowance needs to be made at wellheads to allow for expansion of the heater elements.

FIG. 6 depicts an embodiment of a production well 22 that includes a heater element 56 that radiatively heats heater well casing 66. The inner surface of the heater casing 66 may be blackened, textured, oxidized, or otherwise treated to increase radiative heat transfer between the heater element 56 and the heater casing. The heater well casing 66 may radiatively heat vacuum casing 60. The inner surface of the vacuum casing may be blackened, textured, oxidized, coated or otherwise treated to increase radiative heat transfer between the heater casing and the vacuum casing. Alternately, annular space between the heater casing and the vacuum casing may be filled with packing material. The packing material may include a catalyst that enhances pyrolysis or oxidation of contaminants that pass through the packing material.

A heater well casing 66 may prevent current leakage into the soil 24 as may occur with heater elements that do not have casings. Some current leakage may be acceptable because the current leakage may heat water or soil that is drawing current from the heater elements. If excessive current leak is possible, an external casing may be used to surround the heater element. A heater well casing 66 may be used when the well is to be positioned in a water saturated zone, or into soil that has a high salt content or contains brackish water.

Heater elements 56 that radiatively heat a heater well casing 66 or soil 24 may expand downwards when heated. The heater well casing 66 or the opening in the soil defined by opening wall 67 that the heater element is placed in should be sufficiently long to accommodate thermal expansion of the heater element 56.

As depicted in FIG. 6, spacers 68 may be placed along a length of a heater elements 56 to prevent the heater element from contacting, or electricity from arcing, to an adjacent conduit such as a heater well casing 66. Spacers 68 may also prevent a leg 70 of a heater element 56 that is bent into "U" shapes from contacting, or electricity from arcing, to an adjacent leg of the heater element. Spacers 68 may be made of ceramic insulators. For example, spacers may be made of high alumina ceramic insulation material. Spacers 68 may be obtained from Cooper Industries (Houston, Tex.). Spacers 68 may slide onto heater elements 56. A weld bead may be formed beneath a place where a spacer 68 is to be located so that the spacer cannot pass the weld bead. In an embodiment of a heater element that is vertically positioned in a well, (as depicted in FIG. 6), spacers 68 may be positioned about every ⅓ m to about every ½ m along a length of the heater element. Shorter or longer spacings may be used to accommodate particular heater elements and system requirements. Horizontally oriented heater elements placed within heater well casings may require closer spacings to inhibit sagging of the heater element when the heater element is heated. Spacers 68 may also be positioned between a vacuum casing 60 and/or soil and a heater element 56 of a heater element that conductively heats fill material 62 (as depicted in FIG. 5).

Figure 7:
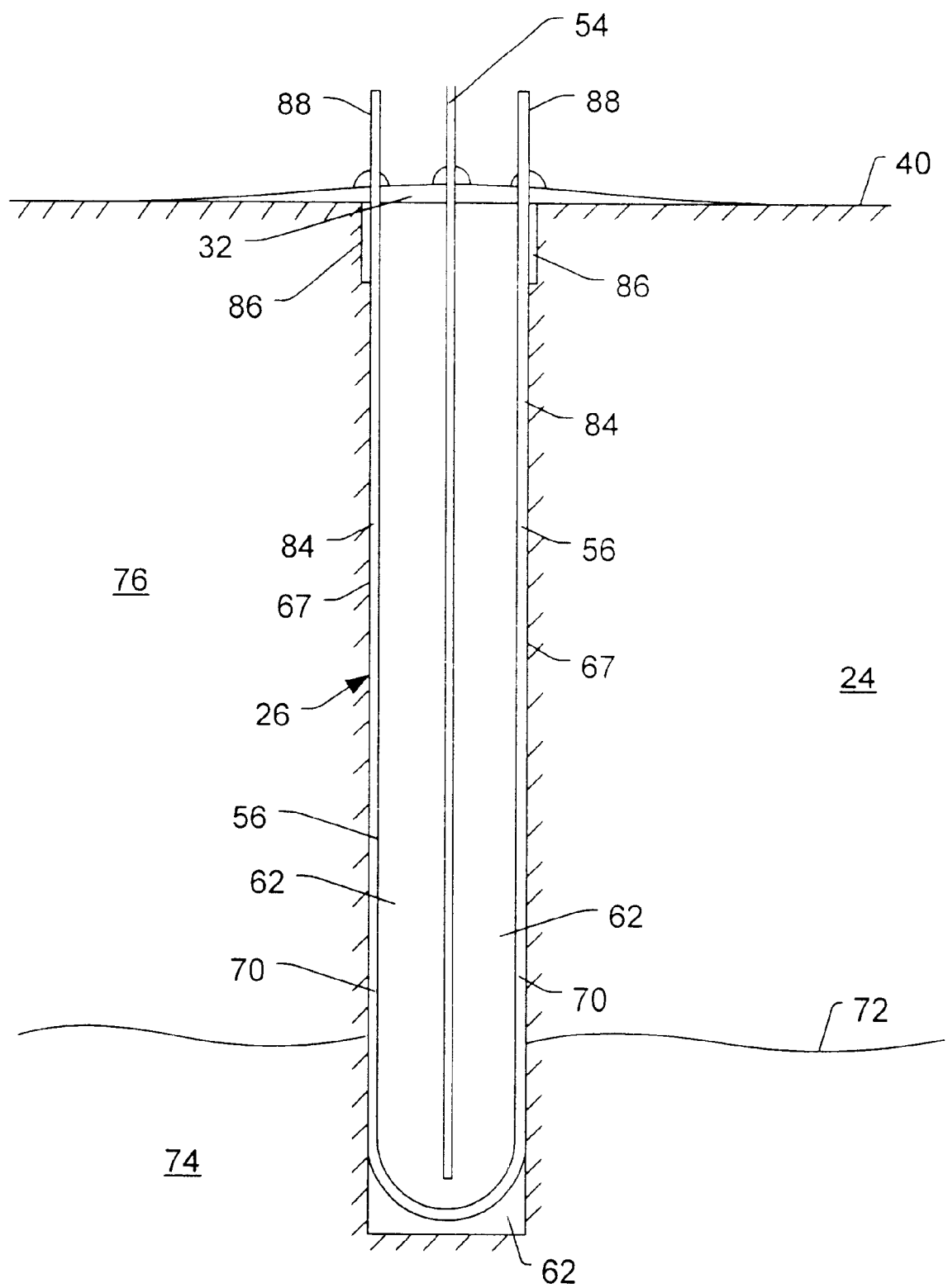
FIG. 7 depicts a representation of an embodiment of a heat injection well that conductively heats soil.
Figure 8:
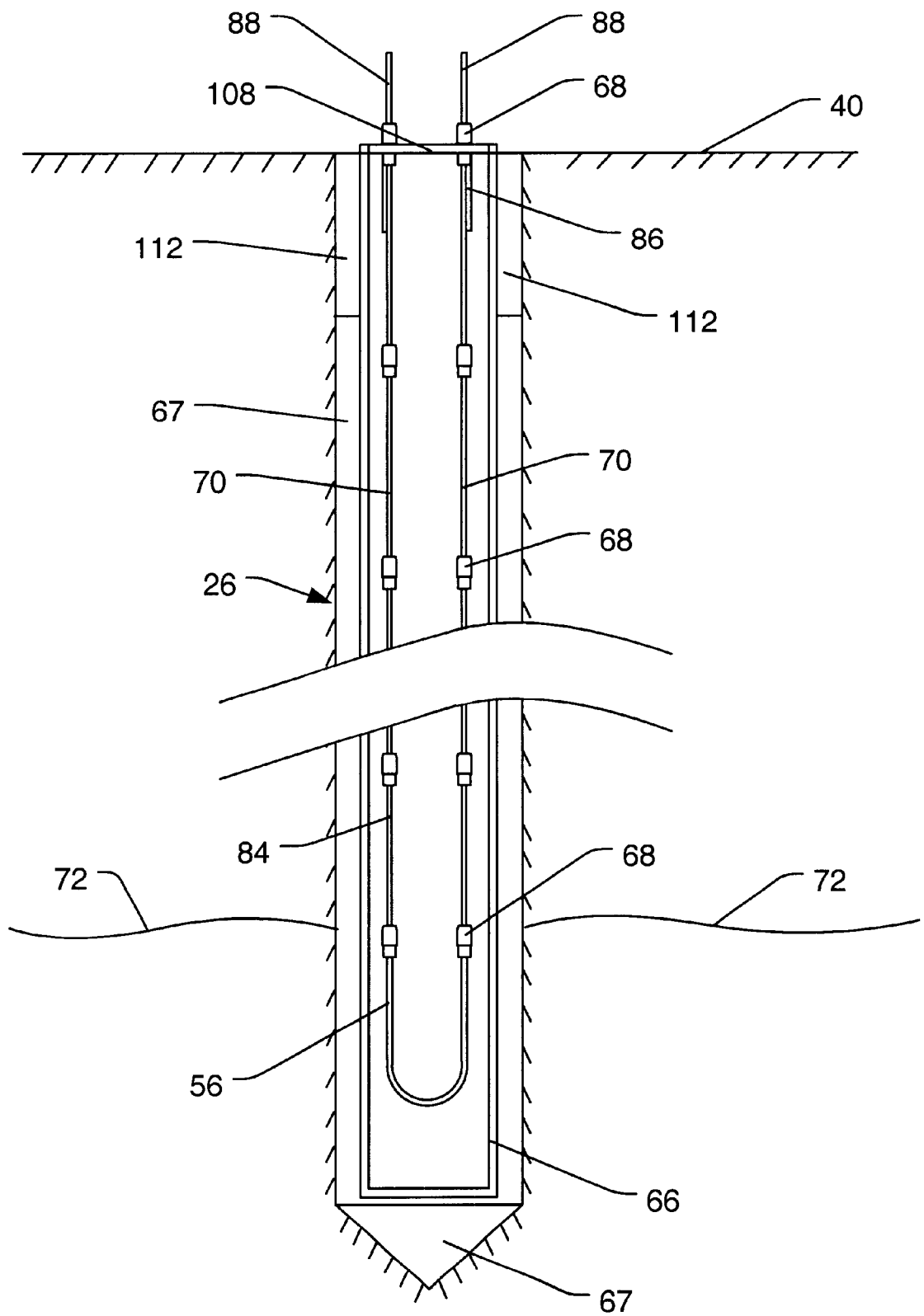
FIG. 8 depicts a representation of an embodiment of a heat injection well positioned within a casing.
Figure 9:
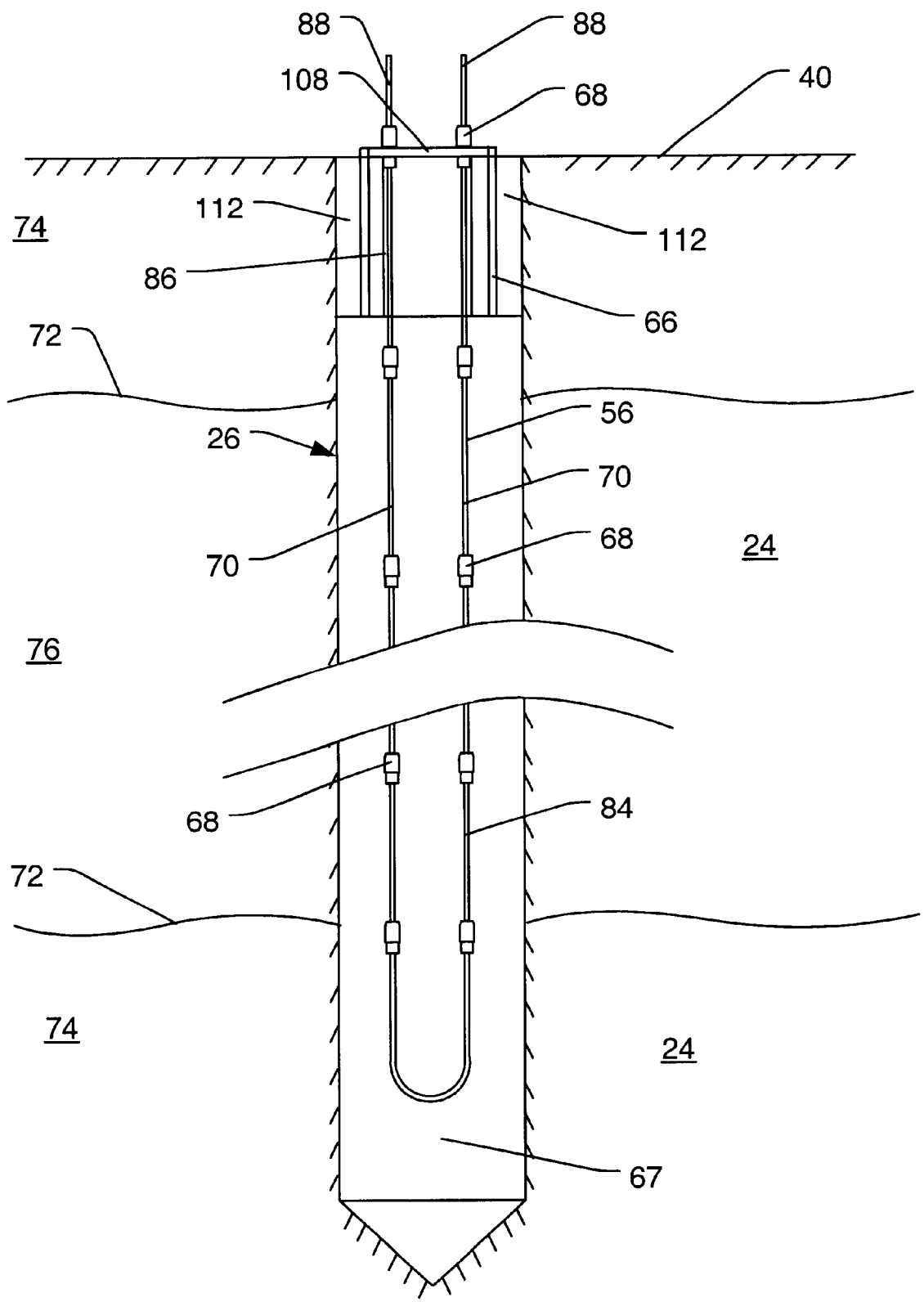
FIG. 9 depicts a representation of an embodiment of a heat injection well that radiatively heats soil.

FIGS. 7, 8, and 9 depict embodiments of heat injection wells 26. The heat injection wells 26 include heater elements 56. An electrical current may be passed through the heater elements 56 to resistively heat the heater elements. FIG. 7 depicts an embodiment of a heat injection well 26 having a heater element 56 that conductively heats soil 24. FIG. 8 depicts a heat injection well embodiment having a heater element 56 that is enclosed in a heater casing 66. In certain embodiments, the heater casing 66 may be packed with fill material. In other embodiments, the heater element may radiatively heat the heater casing. FIG. 9 depicts a heat injection well embodiment having a heater element 56 that radiatively heats adjacent soil 24.

Figure 10:
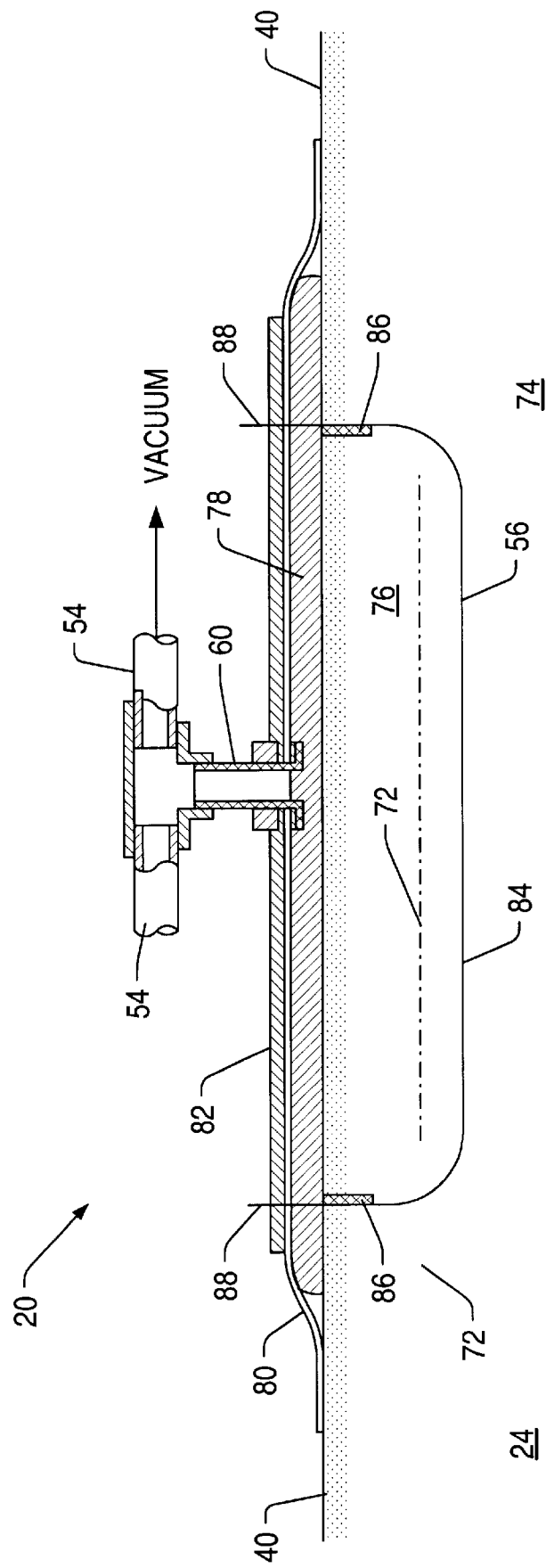
FIG. 10 depicts a representation of an embodiment of a heat element positioned within a trench.

FIG. 10 depicts a representation of an embodiment of a heater element 56 positioned within a trench near to the ground surface 40. The heater element 56 is shown below contamination interface 72 in uncontaminated soil 74. In other embodiments, the heater element 56 may be positioned within the contaminated soil 76, or at or near contamination interface 72. The heater element 56 is shown as having 90° angles to the surface. In practice, ends of the trench may taper towards the surface, and ends of the heater element 56 may be positioned on the tapering ends of the trench instead of having 90° angled ends.

Vacuum drawn by a treatment facility may be applied near the soil surface 40. Permeable mat 78 may be placed on top of the soil surface 40, and an impermeable barrier 80 and a thermal barrier 82 may be placed on top of the mat. The mat 78 may serve as a conduit for flow beneath the impermeable barrier 80. In an embodiment, the mat 78 may be a thin layer of high permeability sand or other granular material. The mat 78 may include catalyst material that enhances thermal degradation of contaminants that pass through the mat. The mat 78 may allow off-gas to flow out of the soil 24 to a vacuum manifold 54 positioned above the mat. The off-gas may flow even when the vacuum draws the impermeable barrier 80 against the mat 78 and compresses the mat. Alternately, suction wells may be inserted into the soil throughout the treatment site to draw off-gas from the soil.

As shown in FIGS. 4–10 heater elements 56 may include heater sections 84, transition sections 86 and pins 88. Some heater elements 56 may not include transition sections between heater sections 84 and pins 88. All or substantially all of a heater section 84 of a heater element 56 may be bare metal. "Bare metal" as used herein refers to a metal that does not include a layer of electrical insulation, such as mineral insulation, that is designed to provide electrical insulation for the heater section 84 during use. Bare metal may encompass a metal that includes a corrosion a inhibiter such as a naturally occurring oxidation layer, an applied oxidation layer, and/or a film. Bare metal includes metal with polymeric or other types of electrical insulation that cannot retain electrical insulating properties at typical operating temperature of the heater section 84 of the heater element 56. Such material may be placed on the metal and may be designed to be destroyed during a soil remediation process. Weld material and/or connector sections of heater sections 84 may include electrical insulation material without changing the nature of the heater element into an insulated heater element. Insulated sections of a heater section 84 of a heater element 56 may be less than 5%, 1%, 0.5%, or 0.1% of a length of the heater section. Bare metal heater elements 56 significantly reduce production cost and increase availability of heater elements as compared to heater elements that include insulated heater sections 84.

In certain embodiments of heater elements 56, portions of transition sections 86 and/or portions of pins 88 may be electrically insulated. In other embodiments of heater elements 56, all of the heater element may be bare metal.

Heater elements 56 depicted in FIGS. 4–10 are positioned substantially vertically or horizontally. Heater elements may be positioned at any desired orientation from 0° (horizontal) to 90° (vertical) relative to ground surface. For example, in a soil remediation system embodiment, heater elements may be oriented at about 45° to remediated soil adjacent to a geological layer that slopes at about 45°. The orientation may be chosen to result in relatively low cost, quick and efficient soil remediation.

Heater sections 84 of heater elements 56 may be formed of metals that are capable of sustained use at high operating temperatures. Portions of a heater element 56 may operate from ambient soil temperatures to sustained temperatures of over 1000° C. In certain heater element embodiments, such as the heater elements depicted in FIGS. 4, 5, 7, 9 and 10, portions, or all, of heater elements 56 may be exposed to off-gas during soil remediation. Such heater elements 56 may need to be made of corrosion resistant metal. The resistance of heater sections 84 to corrosion may be very important. High temperature and high amperage at which heater sections 84 operate may promote corrosion of the heater sections 84. Corrosion may decrease cross sectional areas of the heater sections 84 at certain locations along lengths of the heater sections. Decreased cross sectional areas of the heater section 84 may cause the heater sections to overheat and fail.

Heater sections 84 may be formed of stainless steel. The stainless steel may be, but is not limited to, type 304 stainless steel, type 309 stainless steel, type 310 stainless steel, or type 316 stainless steel. Heater sections 84 may also be formed of other metals including, but not limited to, Nichrome®, Incoloy®, Hastelloy®, or Monel®. For example, a heater section 84 may be made of Nichrome® 80 or Incoloy® 800.

A specific metal used to form a heater section 84 of a heater element 56 may be chosen based on cost, temperature of the soil remediation process, the electrical properties of the metal, the physical properties of the metal, and the chemical resistance properties of the metal. For example, 310 stainless steel is a high temperature stainless steel that may dissipate about 20% more power than 304 stainless steel of equivalent dimensions. The corrosion resistance of 310 stainless steel is better than the corrosion resistance of 304 stainless steel. The upper working temperature limit of 310 stainless steel is about 160° C. higher than the upper working temperature limit of 304 stainless.

Figure 11:
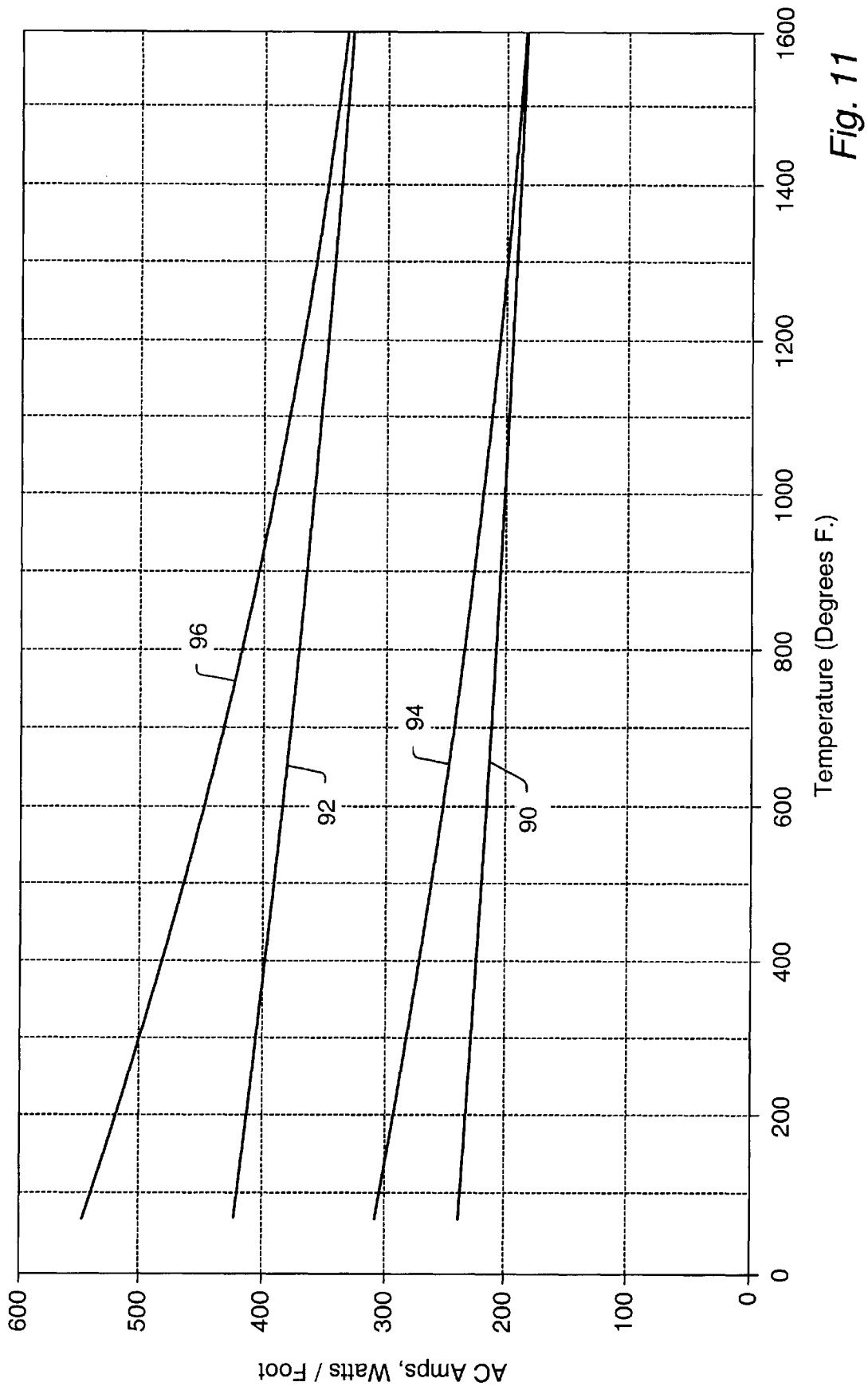
FIG. 11 is a graph of amperage and power/length versus temperature for two heater systems formed of different types of stainless steel.

FIG. 11 depicts both current and dissipated power/length for twenty-seven series connected, "U" shaped heater elements. Each heater element is a metal strip that is 1 inch (2.54 cm) by 0.125 inch (0.318 cm) by 20 foot (6.1 m) long. The heater elements are connected in series by a delta connected, alternating current power source. Reference numeral 90 depicts the current curve for the 310 stainless steel heater elements, and reference numeral 92 depicts the power/length curve for the 310 stainless steel heater elements. Reference numeral 94 depicts the current curve for the 304 stainless steel heater elements, and reference numeral 96 depicts the power/length curve for the 304 stainless steel heater elements. The current and power/length curves for the 310 stainless steel heater elements are both lower than the corresponding current and power/length curves for the 304 stainless steel heater elements. The lower curves for the 310 stainless steel imply that less electrical power needs to be applied to 310 stainless steel heater elements than to equivalent 304 stainless steel heater elements to produce the same heating effect.

The extra temperature range of 310 stainless steel may be used to dissipate extra heat into soil and shorten remediation time. The extra temperature range may be used as a safety margin to insure against overheating the heater element. The cost of 310 stainless steel may be about 25% more than the cost of 304 stainless steel. At a design stage of a soil remediation process, a determination may be made of whether the better characteristics of 310 stainless steel justify the extra cost of the 310 stainless steel above the cost of 304 stainless steel. Similar comparisons may be made for other metals as well.

Heater sections 84 of heater elements 56 may be formed to have selected sections that heat to higher or lower temperatures than adjacent sections of heater elements. Portions of a heater element 56 that are configured to heat to higher temperatures than adjacent portions may be positioned adjacent to interfaces 72 between contaminated soil 76 and uncontaminated soil 74.

Figures 12, 13:
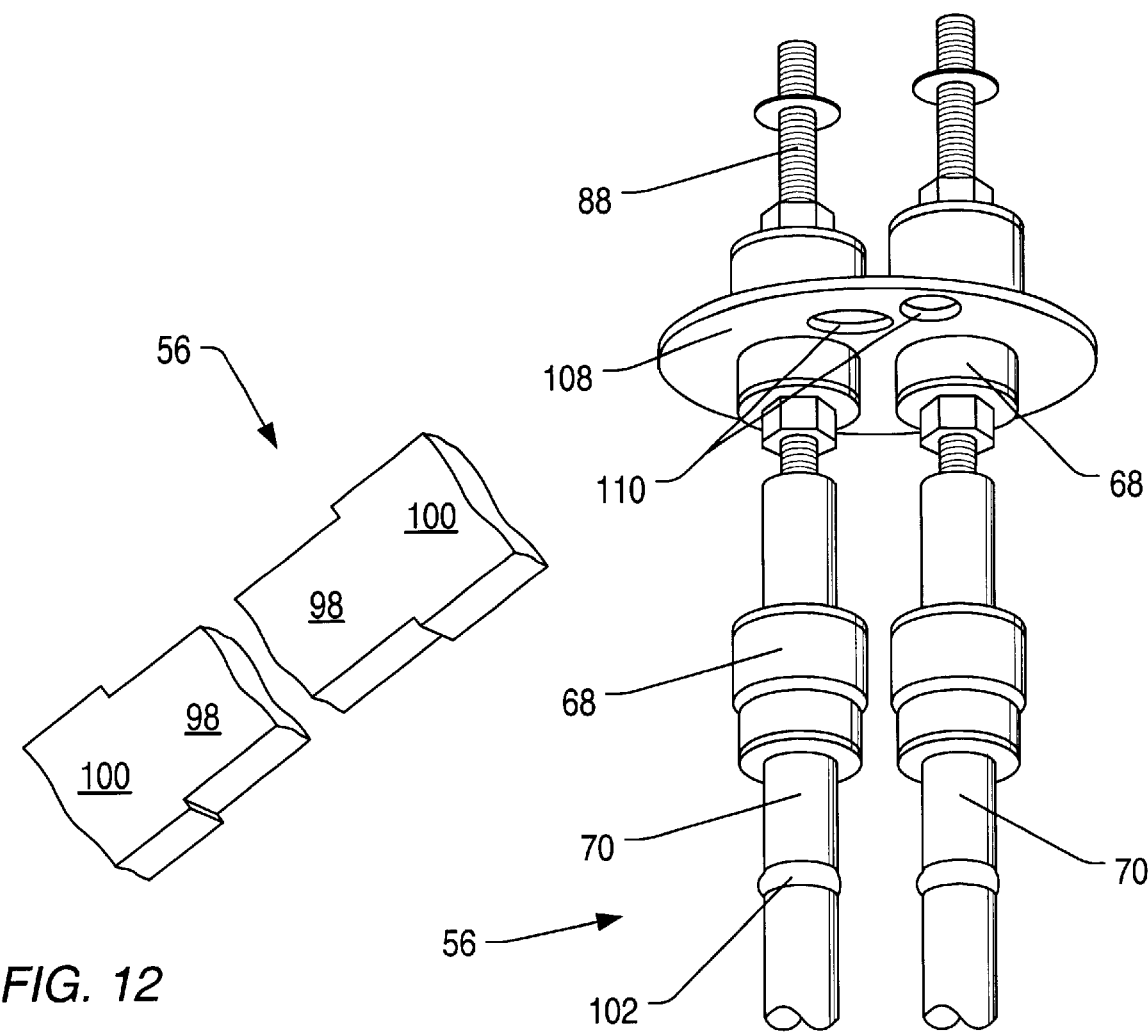
FIG. 12 is a perspective view of a portion of a heater section that has a varying cross sectional area.
FIG. 13 is a perspective view of an embodiment of a heater element.

The extra temperature produced in the high temperature portions may help to counter heat loss due to end effects of the heater section 84. High temperature portions may dissipate greater than 5%, 15%, 25%, or 30% more heat than adjacent portions of the heater section. FIG. 12 shows a portion of a heater element 56 having a high temperature portion that is a reduced cross sectional area portion 98 positioned adjacent to larger cross sectional area portions 100. Metal may be removed from a portion of a heater section 84 to form a high temperature portion of heater section 84. Alternately, the portions of a heater section that are to be heated to higher temperatures than adjacent areas may be portions of a different metal that is more electrically resistive than the metal of the adjacent sections. The more resistive metal may have a larger, same, or smaller cross sectional area than adjacent portions of the heater section. Thermally and electrically conductive weld material may be used to couple the portions 98, 100 together. Care may be taken to ensure that ends of the different metals abut and that a large amount of weld couples the different metal portions together. Abutting metal portions and a large amount of weld material may ensure that failure due to arcing and/or corrosion does not occur at junctions between the metals during use.

Portions of heater sections 84 may heat to lower temperatures than surrounding portions. Such portions may be positioned adjacent to soil layers or obstacles that do not need to be heated to high temperatures. For example a reduced heating section may be designed to reside adjacent to an impermeable, uncontaminated soil layer that is between two contaminated soil layers. A low heating section may be formed of a heating section having increased cross sectional area as compared to adjacent areas. Alternately, a low heating section may be formed of a less electrically resistive metal welded between two adjacent portions of a heater section. Care may be taken to ensure that ends of the different metals abut and that a large amount of weld couples the different metal portions together. Thermally and electrically conductive weld material may be used to couple the portions together. Abutting metal portions and a large amount of weld material may ensure that failure due to arcing and/or corrosion does not occur at junctions between the portions during use.

Transition sections 86 of a heater element 56 may be welded to each end of a heater section 84 of the heater element. Pins 88 may be welded to the transition sections 86. The transition section 86 may reduce a temperature of the heater element 56 so that the temperature at and adjacent to the pin 88 is sufficiently cool to allow use of an insulated connector cable 48 (depicted in FIG. 4) to couple the pin 88 to a power source 46. The transition section 86 may be made of the same material as the heater section 84, but the transition section may have greater cross sectional area. Alternately, the transition section may be made of a material having less electrical resistance than the heater section. The two sections may be welded together. FIG. 13 depicts an embodiment of a heater element 56 that may be used to radiatively heat soil. The heater element 56 includes welds 102 between transition section 86 and heater section 84. Thermally and electrically conductive weld material may be used to couple the sections 84, 86 together. Abutting metal sections and a large amount of weld material may ensure that failure due to arcing and/or corrosion does not occur at a junction between the sections during use.

Pins 88 may be nickel pins. In an embodiment, such as the embodiment depicted in FIG. 4, the pins 88 extend through a ground cover 32 when the heater element 56 is inserted into the soil 24. A connection 104 may electrically couple the pin to a cable 48. The connection 104 may be a mechanical Kerney lug, epoxy canister, or other type of electrical connector. The cable 48 may be electrically coupled to power source 46. The cable 48 may be an electrically insulated cable. Transition section 86 and cold pin 88 may allow the heater element 56, soil 24, and/or cover 32 to be cool enough to inhibit thermal degradation of the cable insulation during use.

In certain embodiments of heater elements, long sections of relatively low resistance metal may be attached to heater sections to form long heated sections that generate temperatures sufficient to inhibit condensation of vapor on or adjacent to the heater element. The low resistance metal may be, but is not limited to, nickel, or alloys of nickel and copper such as Alloy The long heated sections may be needed for deep soil contamination that does not come close to the ground surface.

Figure 14:
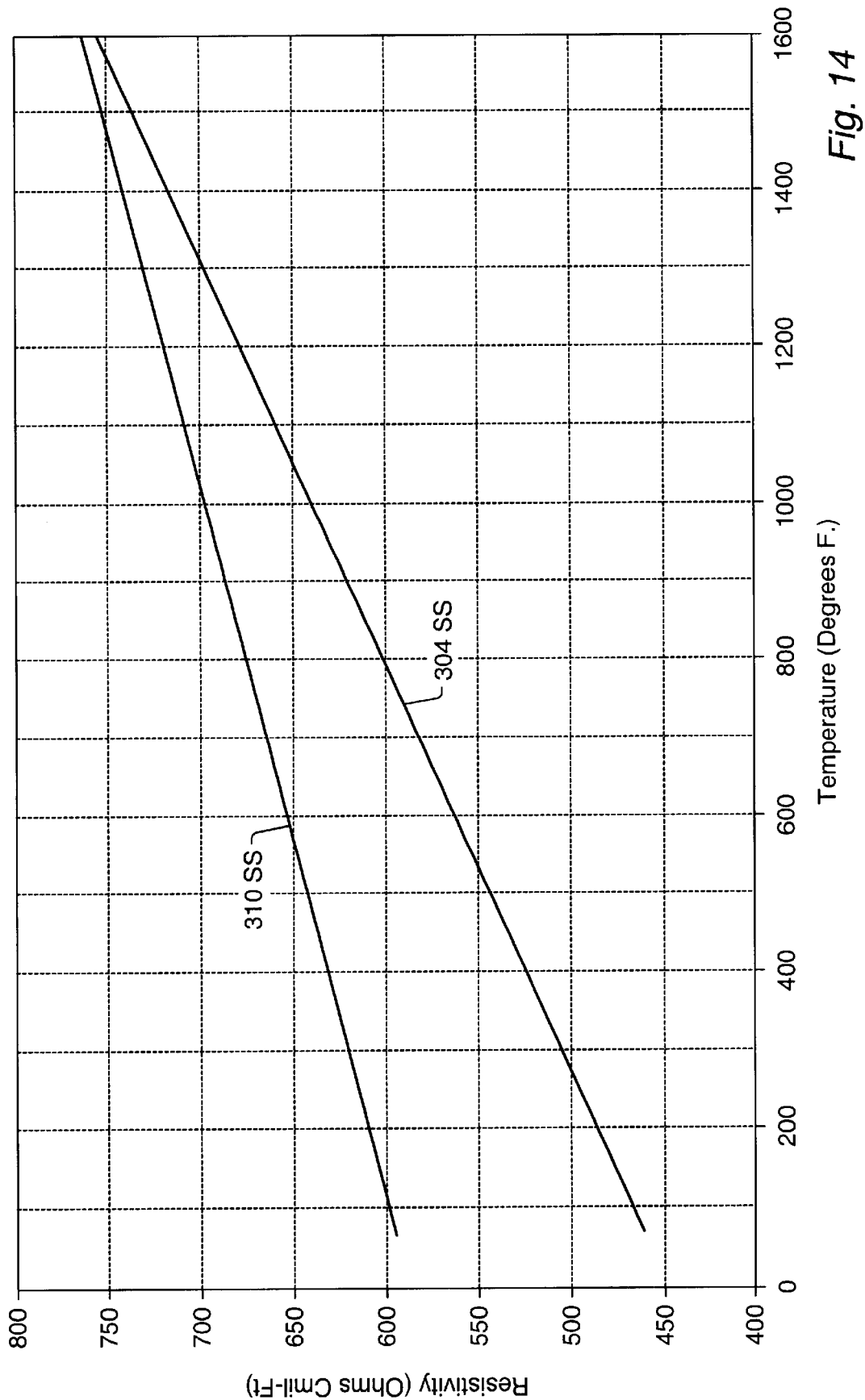
FIG. 14 is a graph of resistivity versus temperature for two types of stainless steel.

In certain embodiments, heater sections 84 of heater elements 56 may be made of metal that allows a heater element temperature to be self-regulating. For example, the heater element may be made of a 304 stainless steel, 310 stainless steel or 316 stainless steel. These stainless steels have resistivity versus temperature curves wherein the resistivity increases substantially linearly as temperature increases. FIG. 14 shows a resistivity versus temperature plot for 310 stainless steel and 304 stainless steel. Power dissipation and amperage through a heater element made of a self-regulating material decrease as temperature increases, and increase as temperature decreases due in part to the resistivity properties of the material and Ohm's Law. For a substantially constant voltage supply to a heater element, if the temperature of the heater element increases, the resistance of the element will increase, the amperage through the heater element will decrease, and the power dissipation will decrease; thus forcing the heater element temperature to decrease. On the other hand, if the temperature of the heater element decreases, the resistance of the element will decrease, the amperage through the heater element will increase, and the power dissipation will increase; thus forcing the heater element temperature to increase. Some metals, such as certain types of Nichrome, have resistivity curves that decrease with increasing temperature for certain temperature ranges. Such materials may not be capable of being self regulating heaters.

A power source 46 (depicted in FIG. 4) for an ISTD soil remediation system may provide a substantially constant voltage to heater elements of the soil remediation system. The power source 46 may be electrical power from a power line that passes through a transformer. Output from the transformer may be coupled to a number of heater wells by parallel and/or series connections to provide an appropriate electrical circuit that will heat soil to a desired temperature.

A heater section 84 of a heater element 56 may have a large cross sectional area as compared to conventional radiant heater elements. The large cross sectional area may allow a heater element 56 to have a small electrical resistance as compared to a conventional heater of equivalent length. The small electrical resistance may allow the heater element 56 to be long. A heater element may be over 10 m, 50 m, or 100 m long, 300 m, 500 m or 600 m long. The small electrical resistance may also allow several heater elements to be electrically connected in series. The ability to connect several heater elements 56 in series may greatly simplify wiring requirements of a soil remediation system. For heater elements that conductively heat adjacent material, the large cross sectional area of the heater section may mean that there will be a large contact area between the heater section and adjacent material. For heater elements that radiatively heat adjacent material, the large cross sectional area of the heater may mean that the heater section has a large surface area that will radiate heat to a casing wall or to soil. Also, the large cross sectional areas of heater elements may allow the heater elements to be placed in the soil without being attached to a support structure. In an embodiment of a radiative heater element, the heater element is made of 304 stainless steel rod stock having a diameter of about 1 cm.

Radiative heater elements that are suspended within a well casing may have telescoping sections of different alloys and/or different cross sectional areas to produce long heater elements. A first section may be made of a material that has a high creep resistance at operating temperatures of the heater element. The first section may be relatively thick or have a relatively large effective diameter. Many high strength, high creep resistance materials, such as Inconel 617 and HR 120, have higher electrical resistances than stainless steels that may be used to form primary heater sections of the heater element. Higher resistance material allows the high strength and creep resistant sections (one on each leg of a "U" shaped heater element) to heat to high temperatures even though the sections have large cross sectional areas. A second section may be made of a less expensive metal that is welded to the first metal. The second section may have a smaller thickness or effective diameter than the first section. Additional sections may be welded to the strip to form a heater element having a desired length. The diameters of the various metals, taking into consideration the resistivity of the metals, may be adjusted to produce a long heater element that dissipates substantially the same amount of energy per unit length along substantially the entire length of the heater. Metals used to form the sections may include, but are not limited to Inconel 617, HR 120, 316 stainless steel, 310 stainless steel, and 304 stainless steel. In an embodiment of a long, radiative, suspended heater element, a lead in section of about 30 m is made of 316 stainless steel and is used to suspend the heater element from a wellhead.

The lead in section functions as a heater section of the heating element. A second heater section may be formed of a narrower cross sectional area of 304 stainless steel (up to about 25% less cross sectional area to dissipate the same amount of heat as the lead in section). The second heater section in the particular embodiment is 160 m in length, resulting in a "U" shaped heater element having a (30 m+80 m) 110 m long heating section with a total heater section length of 220 m. A portion of the second heater section near a 180° bend (or hairpin turn) in the heater element may have a further reduced cross sectional area or a different alloy metal to dissipate more heat than adjacent heater element sections.

In certain embodiments of radiative heater elements, a support section of a radiative heater element may have a cross sectional area that tapers to a substantially constant cross sectional area. A support section may be made of the same material or a different material than other portions of a heater element. The support section may be a transition section of a heater element that does not need to rise to high operating temperatures. The support section may be a portion of heater section that will rise to high operating temperatures during use.

For a heater element 56 that conductively heats adjacent material, heater section 84 may have a substantially rectangular cross sectional area. For example, an embodiment of a heater section 26 has a 25 millimeters (mm) by 3 mm rectangular cross section and a length of about 6 meters. The dimensions of a heater section may be chosen so that the heater section produces and dissipates a desired amount of heat when inserted into soil and when coupled to a power source. Cross sectional shapes other than rectangular shapes may also be used. The cross sectional shapes may be, but are not limited to, ellipsoidal, circular, arcuate, triangular, rectangular, pentagonal, hexagonal, or higher order polygon shaped. Heater elements that transfer heat by radiation may typically have a substantially circular cross sectional area, but other cross sectional areas, such as the cross sectional areas referred to above, may also be used.

Heater elements may be positioned within the soil in a variety of ways. Some heater elements 56 may be directly placed within the soil, such as the embodiment of a heater element depicted in FIG. 7. Other heater element embodiments may be separated from the soil by packing material 62, such as is depicted in the embodiment of FIG. 4. Other heater elements may be placed in heater casings 66, such as the heater element depicted in FIG. 6. The heater casing 66 may be placed or packed in the soil, or the heater casing may be placed in a vacuum casing 60 that is placed or packed in the soil. Placing a heater element 56 in a heater element casing 66 may allow the heater element to be made of a relative inexpensive, non-corrosion resistant material because off-gas will not come into direct contact with the heater element. The heater element casing 66 may be made of a material that has sufficient corrosion resistance to resist breakthrough corrosion during the estimated time needed to complete soil remediation.

A heater element 56 may be driven directly into the soil. A drive rod may be positioned at the center of a heater element 56. The drive rod may then be pounded into the soil 24. When the heater element 56 is inserted to a desired depth, the drive rod may be withdrawn. The drive rod does not need to be a continuous rod. The drive rod may be made of threaded sections that are assembled together as the drive rod is pounded deeper into the soil 24. A geoprobe or a cone penetrometer rig may be used to drive a heater element 56 into the soil 24. Also, a sonic rig may be used to vibrate heater element 56 to a desired depth. The sonic rig may include an eccentric cam that vibrates a heater element 56 and a drive rod to a desired soil depth. Driving or vibrating a heater element 56 into soil 24 may not produce cuttings as are produced when an augered opening is formed in the soil. Driving or vibrating a heater element 56 may eliminate problems associated with disposing of cuttings produced during the formation of an augered hole. Avoidance of the production of cuttings may be particularly advantageous at extremely toxic or radioactive sites. Also, driving or vibrating a heater element 56 into the soil 24 may advantageously place a portion of the heater element 56 in direct contact with the soil to be heated.

For heater elements 56 placed in openings or well casings, the heater elements 56 may be formed in "U" shapes so that ends of both legs 70 of the heater element are accessible at ground surface 40. Accessibility of both legs 70 allows many heater elements 56 to be easily and efficiently coupled together electrically. Spacers may be positioned at desired locations along a length of the heater element. The heater element may be lowered into the opening or casing. If fill material is to be used to pack the casing, as depicted in FIG. 4, fill material 62 may be placed adjacent to the heater element 56. To place the fill material 62, a fill pipe, such as a polyvinyl chloride pipe, may be inserted between legs 70 of a "U"-shaped heater element 56. If fill material is to be placed between legs 70 of the heater element and the soil 24, tubes suspended by wire may be lowered down the legs of the heater element. The tubes may be raised as fill material 62 is placed in the opening. The tubes may properly position each leg of the heater element 56. In certain embodiments, the fill pipe may press the heater element against the soil. Fill material 62 may be inserted through the fill pipe while raising the fill pipe out of the soil 24. The fill material 62 may plug spaces between the heater element 56 and the soil 24. The fill material 62 may include sand and/or gravel. The fill material 62 may also include catalyst 64, such as aluminum oxide. Catalyst 64 may be a component of fill material for both production wells 22 and heat injection wells 26. The fill material 62 may be heated to remove moisture before being inserted through the fill pipe. The fill material 62 may be built up in a mound at the soil surface 40 to promote water runoff away from the heater element 56. Thermocouple well 106 may be positioned in the fill material 62 between the legs 70 of a U-shaped heater element 56. A thermocouple placed in the thermocouple well 106 may be used to measure the temperature between the legs 70 of the heater element 56 during soil remediation. The thermocouple may be lowered or raised to determine temperatures at selected depths. Alternately, the thermocouple may be fixed within the thermocouple well. In an embodiment depicted in FIG. 4, the thermocouple well 106 is 0.64 cm diameter stainless steel tubing that is inserted into the center of a 4 cm diameter stainless steel vacuum casing 60. A thermocouple positioned within the thermocouple well 106 may be used to monitor the temperature of a heater element 56 adjacent to the casing 60.

Dry fill material may need to be packed within a well in a substantially uniform manner. Dry fill material may need to be used to avoid formation of gaps and/or settling of the fill material when water within the fill material evaporates. If a gap exists within the fill material, a leg of the heater element may expand into the gap when the heater element expands. If a leg of a heater element expands into a gap, the leg may contact or approach the opposite leg of the heater element. If the leg contacts the opposite leg, the heater element may short and fail. If the leg approaches the opposite leg, electricity may arc to the opposite leg and cause the heater element to fail.

If a heater element 56 is to be a radiant heating element, the heater element may include top 108 as depicted in FIG. 13. The top 108 may thread onto a heater casing 66 near the ground surface 40, or the top may be welded to the heater casing, to form a wellhead for the heater element. If the casing is an enclosed heater casing 66, the casing may be filled with a gas. In some embodiments, the gas may enhance thermal conduction between the heating element 56 and the casing 66 to improve heating response time during initial heating. In some embodiments, the gas may be a corrosion inhibiter. The top 108 may include openings 110. A fill tube may be placed in a first opening and the gas may be flowed into the casing 66. Gas originally in the casing 66 may flow out of the second opening. When the desired gas fills the casing 66, the second opening may be plugged, the tube may be removed, and the first opening may be plugged.

If the heating element 56 is to be placed in an open wellbore, as depicted in FIG. 9, cement 112 or another type of securing method or device may fix casing 66 to the soil 24. The top 108 may be threaded or welded to the casing 66.

Figure 15:
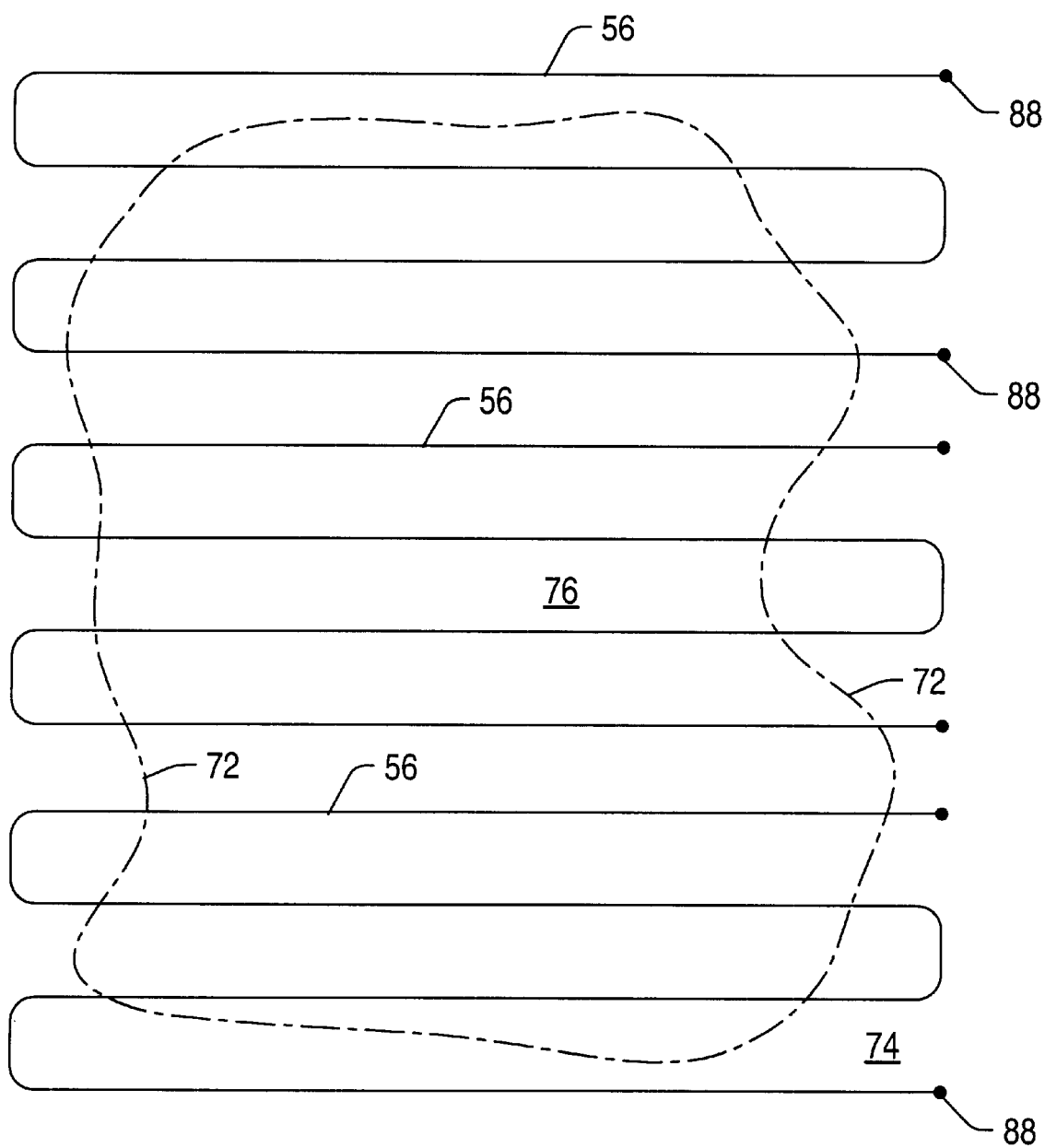
FIG. 15 depicts a schematic representation of a layout plan for heater elements placed in trenches.

FIG. 15 shows a plan view of an embodiment of a layout for heater elements 56 positioned within trenches. Heater elements 56 placed in trenches may be placed in long rows. For heater elements 56 that conductively heat adjacent material, more than one heater element may be placed in a single trench as long as a distance between heater elements, fill material, or spacers ensure that the heater elements will not touch or be close enough to each other to arc. For heater elements that radiatively heat a heater casing, more than one heater element may be placed within a single heater casing. Heater elements 56 may be placed in trenches that were formed by a trenching machine. After the heater elements 56 are positioned within trenches and electrically coupled to a powersource, cuttings formed when making the trench may be used to fill the trenches. A vacuum system may be installed, a cover may be placed over the treatment area, and the system may be energized. Heater elements placed in trenches may be used to treat low depth soil contamination that is within about 2 meters of the soil surface 40. Heater elements positioned in trenches may have long lengths that span across a contaminated soil 76. In certain embodiments, rows of heater element 56 may be separated by distances equal to about twice the insertion depth of the heater element into the soil 24.

A heater element 56 may be placed in soil 24 so that a portion of the heater section 84 is below contaminated soil, and a portion of the heater section is above the contaminated soil 76. The portion of the heater section 84 below the contaminated soil 76 may be one or more feet in depth. Heating a section of uncontaminated soil 74 below the contaminated soil 76 may prevent fall off in temperature at interface 72. The cross sectional area of the heater element 56 adjacent to contamination interfaces 72 may be small, or may be made of a different material, so that more heat is diffused into the soil adjacent to the interfaces. Diffusing more heat adjacent to the interfaces may promote a more uniform temperature distribution throughout the contaminated soil 76.

To implement an ISTD soil remediation process, such as the process depicted in FIG. 1, wells may be positioned in the soil. The wells may be installed by placing wells within drilled openings, by driving and/or vacuuming wells into the ground, or by any other method of installing wells into the soil. The wells may be production wells 22, heat injection wells 26, fluid injection wells 28, and/or test wells 30. A ring or rings of dewatering wells may be installed around a perimeter of the area to be treated. The dewatering wells may be operated to remove water from the treatment area and to inhibit water inflow into the treatment area. In some embodiments, production wells, and/or fluid injection wells (and possibly other types of wells) may be connected to dewatering pumps so that the treatment area is rapidly and efficiently dewatered.

Heat injection wells 26 and production wells 22 that include heater elements may be coupled to controllers (if necessary) and to a power source 46 or power sources. The production wells 22 may be coupled to vapor collection system 36. The vapor collection system 36 may be connected to treatment facility 34. Other wells, such as fluid injection wells 28 and test wells 30, may be coupled to appropriate equipment. In some embodiments, the treatment facility 34 may be engaged to begin removing off-gas from soil 24. The heat injection wells 26 and production wells 22 that include heater elements may be energized to begin heating the soil 24. The heating may be continued until the soil reaches a desired average temperature for a desired amount of time. The desired average temperature may be slightly higher that the boiling point of a high boiling point contaminant within the soil 24. The desired average temperature may be over 100° C., 400° C., 600° C., or higher. The desired amount of time may be days, weeks, months or longer. The desired amount of time should be sufficient to allow for contaminant removal from the soil 24.

Wells that inject heat into the soil 24 may be de-energized after completion of the soil remediation in a desired treatment area. If the treatment area is only a portion of a larger treatment area, the next section may be processed. A portion of heat applied to a first section may be used to heat a second section that is to be treated. The heat may be recovered from the first section by passing a heat transfer fluid into wells in a first section to heat the transfer fluid and then passing the heat transfer fluid into the second section to heat the second section. Alternately, water may be injected into selected production wells and steam may be produced from other production wells. The steam may be used as a heat transfer fluid to heat soil in a second section that is to be remediated. Treated soil may also be allowed to gradually cool over time. Wells (heat injection, fluid injection, production, and/or test) may be removed from the soil. Portions or all of the wells may be reusable.

Figure 16:
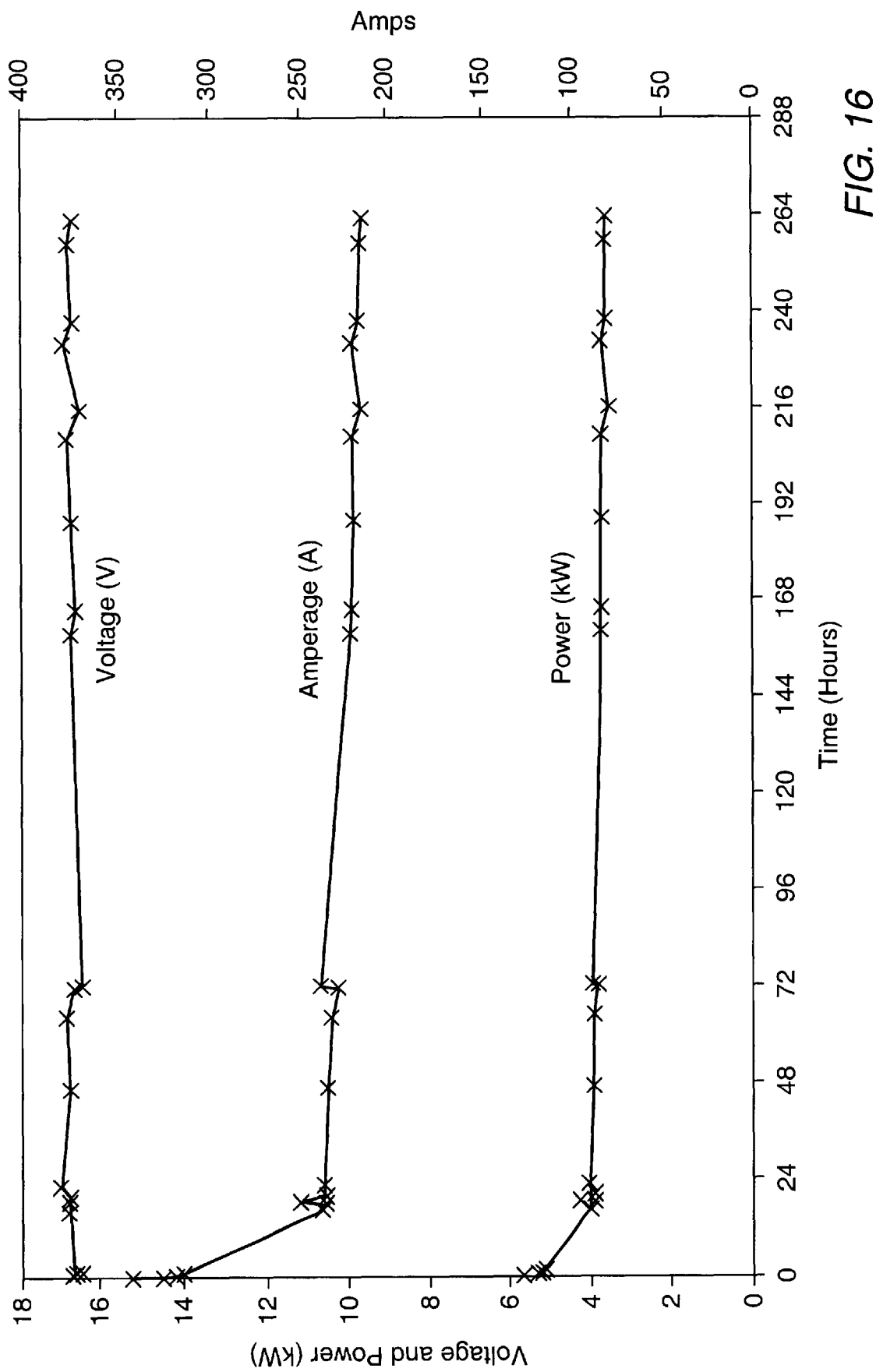
FIG. 16 shows voltage, amperage, and power data for a heater element as a function of time.
Figure 17:
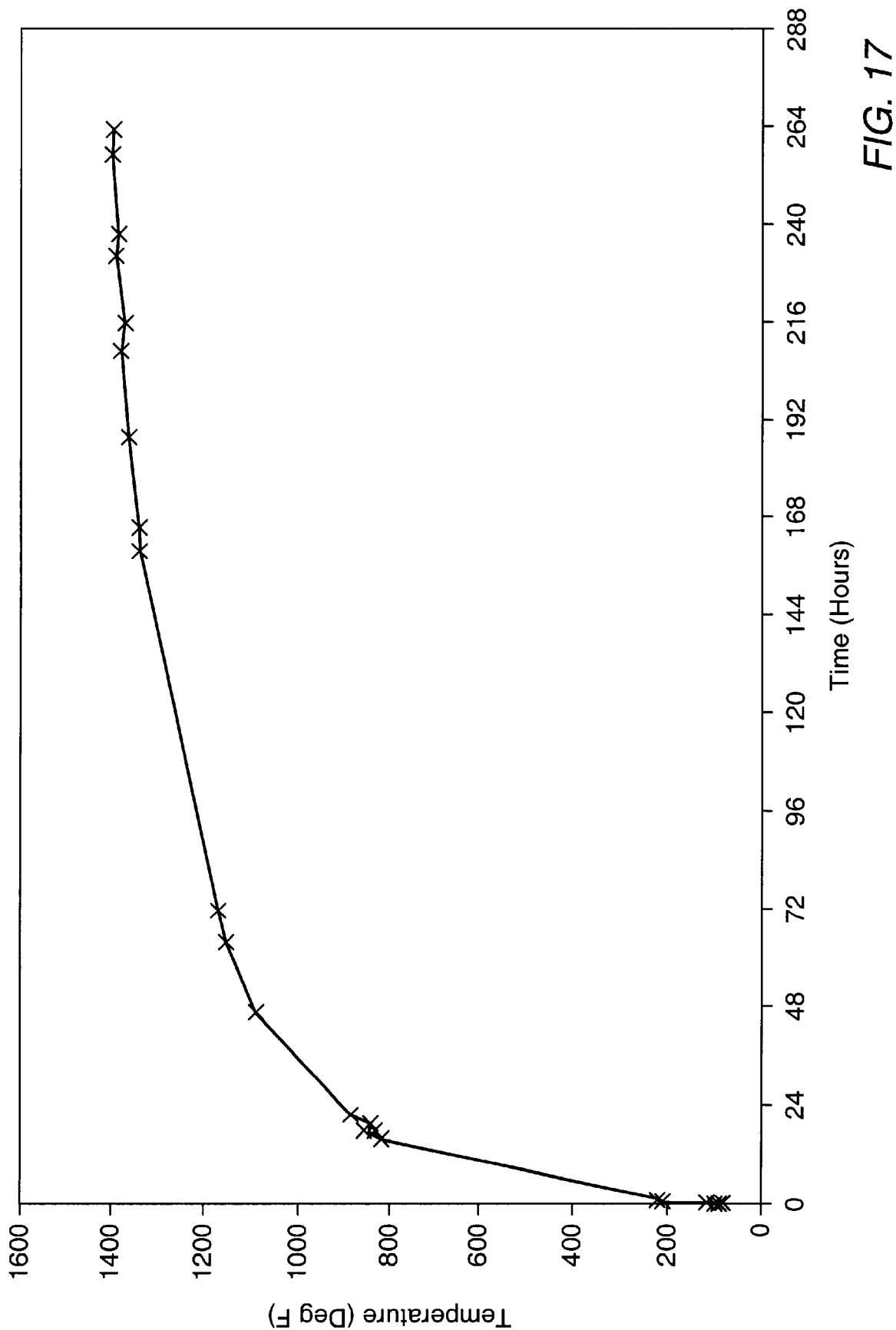
FIG. 17 shows temperature data for the heater element of FIG. 16 as a function of time.
Figure 18:
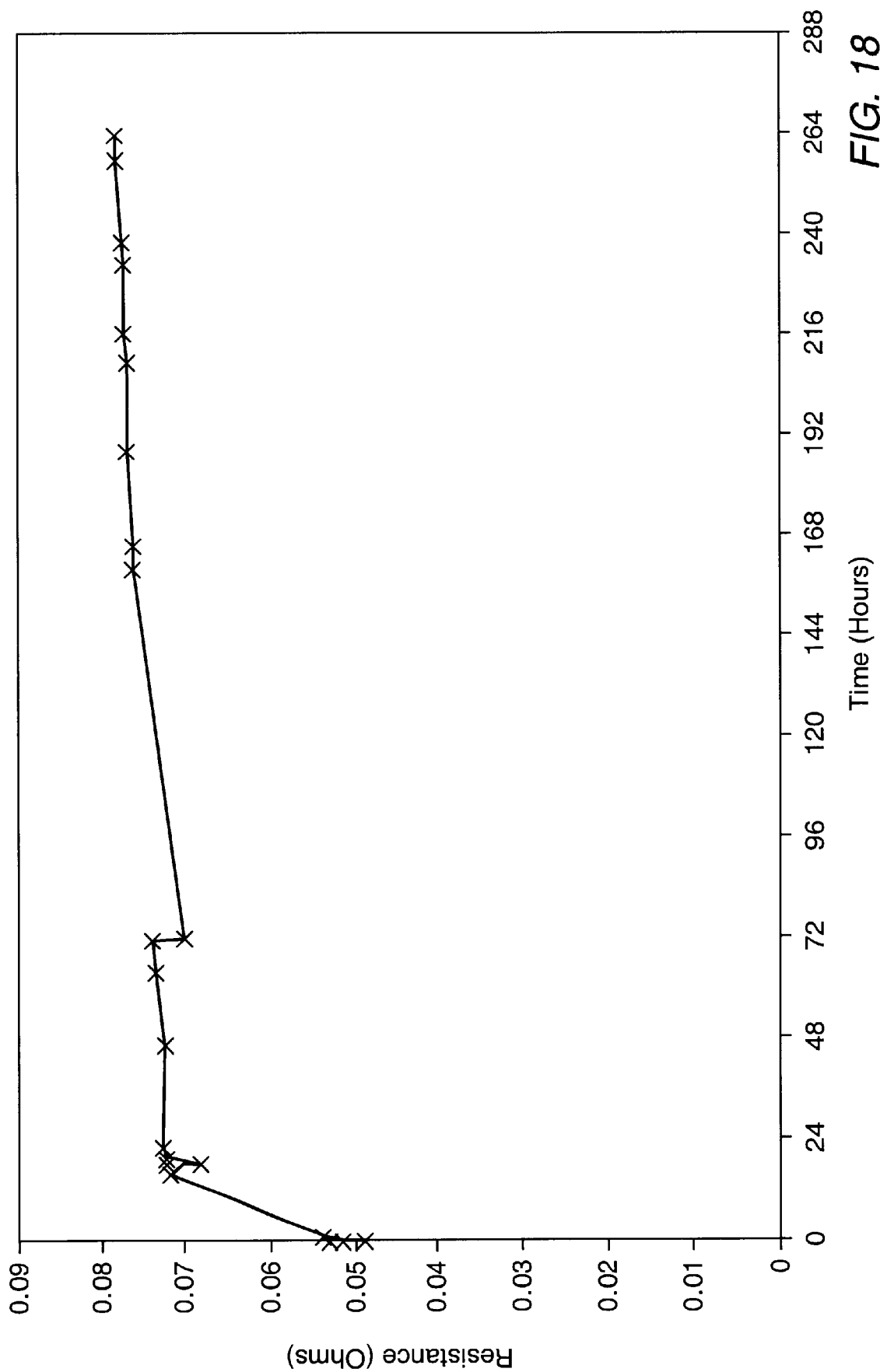
FIG. 18 shows resistance data for the heater element of FIG. 16 as a function of time.
Figure 19:
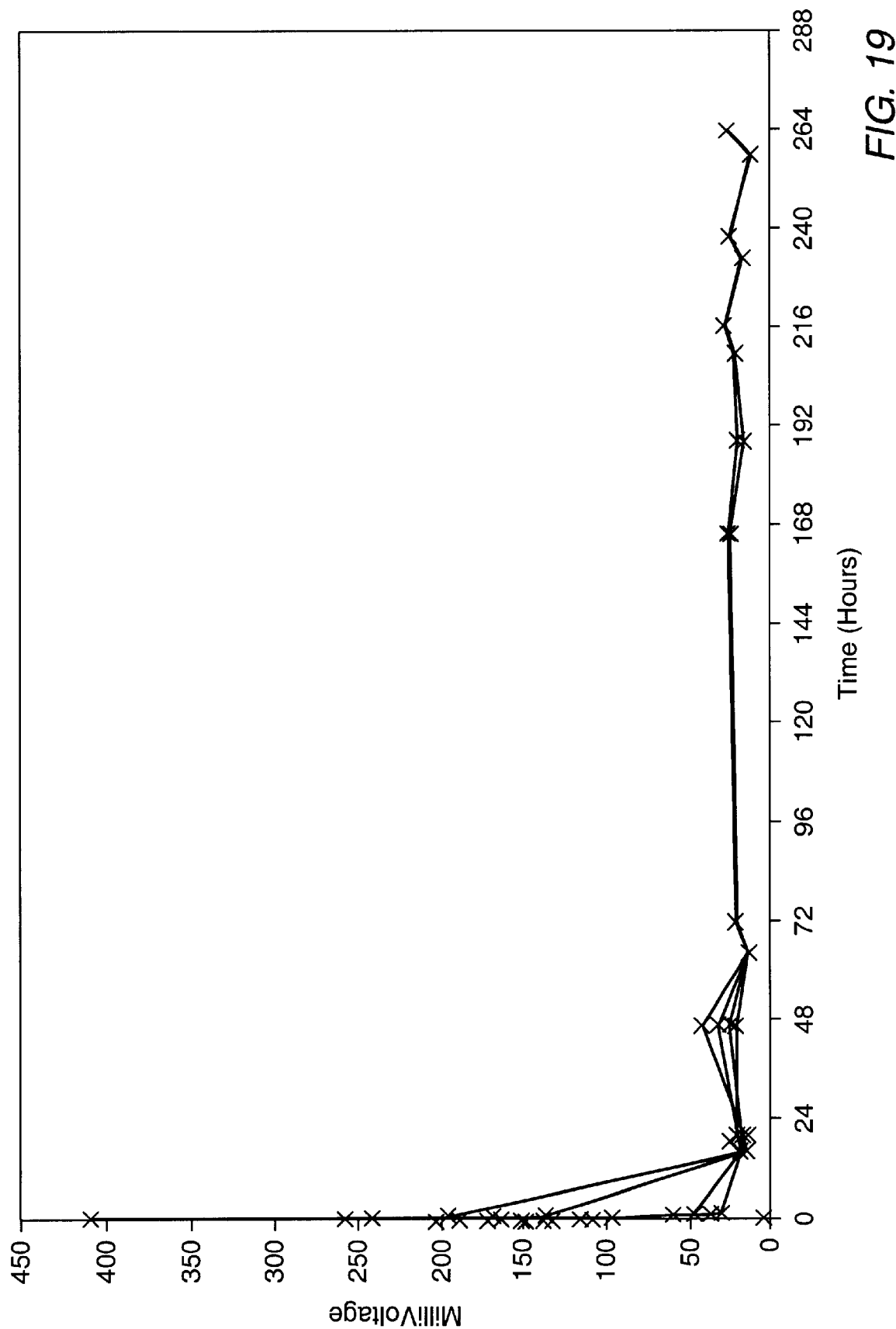
FIG. 19 shows potential voltage near the heater element of FIG. 16 as a function of time.

FIG. 16 shows electrical data for a "U" shaped heater element positioned within a heat injection well for an eleven day test. The power started at about 1640 Watts/m and decreased to a steady state value of about 1245 W/m after about 20 hours of operation. The decrease in the power reflects heating and drying of the sand and soil adjacent to the heater elements. FIG. 17 shows the temperature rise of the heater element as measured by a thermocouple positioned between legs of the heater element. FIG. 18 shows the calculated increase in resistance of the heater element as a function of time. As the resistance increases over the first 20 hours, the power dissipation of the heater section decreases. An increase in resistance may also be a result of corrosion metal loss. However, very little corrosion was observed after more than 10 days of operation. FIG. 19 shows values of ground potential measured at copper stakes located 7-inches (0.18 m) and 14-inches (0.36 m) away from the heat injection well. The initial ground potential was only 0.5 V, and it decreased to a background level of 40 mV after about 20 hours of operation when the sand and soil dried out. The dry sand and soil were excellent electrical insulators.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A heater well for soil remediation, comprising:
 a heater element positioned in soil, wherein the heater element comprises an outer, bare metal surface having a cross-sectional area greater than about 30 square millimeters and a length of over 1 meter;
 a suspended section supported from a support section near a top portion of the heater element, and wherein the support section comprises a creep resistant metal; and
 a power source electrically coupled to the heater element, wherein the power source provides electricity to the heater element to resistively heat the outer, bare metal surface, and wherein heat transfers from the outer, bare metal surface to the soil.

2. The heater well of claim 1, wherein the heater element provides radiant heat to a well casing.

3. The heater well of claim 1, wherein the heater element provides radiant heat directly to the soil.

4. The heater well of claim 1, wherein the heater element provides conductive heat to fill material.

5. The heater well of claim 1, wherein the heater element provides conductive heat directly to the soil.

6. The heater well of claim 1, wherein the heater element is placed within a heater well casing that inhibits contact of fluid from the soil with the heater element.

7. The heater well of claim 1, further comprising fill material adjacent to the heater element.

8. The heater well of claim 7, wherein the fill material comprises catalyst to promote degradation of contaminants.

9. The heater well of claim 1, wherein the heater element comprises a metal having self-regulating resistivity characteristics within an operating temperature range from initial ambient soil temperature to at least about 875° C.

10. The heater well of claim 1, wherein the metal comprises 304 stainless steel.

11. The heater well of claim 1, further comprising a casing adjacent to the heater element, the casing having at least one casing opening to allow off-gas to pass into the casing.

12. The heater well of claim 1, wherein the support section comprises a portion of the heating section.

13. The heater well of claim 1, wherein a portion of the bare metal surface is located within a trench.

14. The heater well of claim 1, wherein the heating section comprises a first section and a second section, wherein the first section dissipates more heat than the second section.

15. The heater well of claim 14, wherein the first section is positioned near an interface between contaminated soil and uncontaminated soil, and wherein the second section is positioned adjacent to the contaminated soil.

16. A radiative heater element for heating soil during soil remediation, comprising:
 a support section configured to couple to a wellhead to support the heater element;
 a heating section comprising an outer, bare metal surface configured to be resistively heated in order to transfer heat to soil;
 pin sections configured to couple the heater element to an electrical power source; and
 wherein the heater element is suspended within a casing that inhibits fluid from the soil from contacting the heater section of the heater element, and wherein at least a portion of the heater element is positioned in an opening in the soil.

17. The heater element of claim 16, further comprising transition sections between the heating section and the pins that allow the pins to be at temperatures less than a temperature of the heating section.

18. The heater element of claim 16, further comprising fill material positioned between the casing and the soil.

19. The heater element of claim 18, wherein the fill material comprises catalyst to promote degradation of contaminants.

20. The heater element of claim 16, further comprising a conductive heat transfer gas within the casing.

21. The heater element of claim 16, further comprising a corrosion inhibiting gas within the casing.

22. The heater element of claim 16, wherein the heater element is suspended within the soil so that a portion of the heating element radiates heat directly to the soil.

23. The heater element of claim 16, wherein a portion of the heating section comprises the support section.

24. The heater element of claim 16, further comprising electrically insulating spacers positioned along a length of the heater element.

25. The heater element of claim 16, wherein the heater section comprises a first section and a second section, and wherein the first section has a higher resistivity than the second section so that the second section dissipates more heat than the first section.

26. The heater element of claim 16, wherein the heater section comprises a first section and a second section, wherein the heater element is suspended by the first section, wherein the first section is made of a material having higher creep resistance at high temperature than the second section.

27. A radiative heater element for heating soil during soil remediation, comprising:
   a support section configured to couple to a wellhead to support the heater element;
   a heating section comprising an outer, bare metal surface configured to be resistively heated in order to transfer heat to soil;
   pin sections configured to couple the heater element to an electrical power source; and
   wherein at least a portion of the heater element is positioned in an opening in the soil, and wherein the heater element is suspended within the soil so that a portion of the heating element radiates heat directly to the soil.

28. The heater element of claim 27, further comprising a metal having self-regulating resistivity characteristics within an operating temperature range from initial ambient soil temperature to at least about 875° C.

29. The heater element of claim 27, wherein the metal comprises 304 stainless steel.

30. The heater element of claim 27, wherein the metal comprises 310 stainless steel.

31. The heater element of claim 27, further comprising a casing adjacent to the heater element, the casing having at least one casing opening to allow off-gas to pass into the casing.

32. The heater element of claim 27, comprising electrically insulating spacers positioned along a length of the heater element.

33. The heater element of claim 27, wherein the heating section comprises a first section and a second section, wherein the first section dissipates more heat than the second section.

34. The heater element of claim 27, wherein the first section is positioned near an interface between contaminated soil and uncontaminated soil, and wherein the second section is positioned adjacent to the contaminated soil.

35. The heater element of claim 27, further comprising transition sections between the heating section and the pins that allow the pins to be at temperatures less than a temperature of the heating section.

36. The heater element of claim 27, further comprising a conductive heat transfer gas within the casing.

37. The heater element of claim 27, further comprising a corrosion inhibiting gas within the casing.

38. The heater element of claim 27, wherein the support section comprises a creep resistant material.

39. A radiative heater element for heating soil during soil remediation, comprising:
   a support section configured to couple to a wellhead to support the heater element;
   a heating section comprising:
      an outer, bare metal surface configured to be resistively heated in order to transfer heat to soil;
      a first section; and
      a second section, wherein the heater element is suspended by the first section, wherein the first section is made of a material having higher creep resistance at high temperature than the second section;
   pin sections configured to couple the heater element to an electrical power source; and
   wherein at least a portion of the heater element is positioned in an opening in the soil.

40. The heater element of claim 39, wherein the heater element is placed within a heater well casing that inhibits contact of fluid from the soil with the heater element.

41. The heater element of claim 39, further comprising fill material adjacent to the heater element.

42. The heater element of claim 41, wherein the fill material comprises catalyst to promote degradation of contaminants.

43. The heater element of claim 39, wherein the heater element comprises a metal having self-regulating resistivity characteristics within an operating temperature range from initial ambient soil temperature to at least about 875° C.

44. The heater element of claim 39, wherein the metal comprises 304 stainless steel.

45. The heater element of claim 39, wherein the metal comprises 310 stainless steel.

46. The heater element of claim 39, further comprising a casing adjacent to the heater element, the casing having at least one casing opening to allow off-gas to pass into the casing.

47. The heater element of claim 39, wherein a portion of the bare metal surface is located within a trench.

48. The heater element of claim 39, further comprising electrically insulating spacers positioned along a length of the heater element.

49. The heater element of claim 39, further comprising transition sections between the heating section and the pins that allow the pins to be at temperatures less than a temperature of the heating section.

50. The heater element of claim 39, further comprising a conductive heat transfer gas within the casing.

51. The heater element of claim 39, further comprising a corrosion inhibiting gas within the casing.

52. A heater well for soil remediation, comprising:
   a heater element positioned in an uncased opening in soil, wherein the heater element comprises:
      an outer, bare metal surface having a cross-sectional area greater than about 30 square millimeters and a length of over 1 meter; and
      a suspended radiative heating element that comprises a support section formed of a creep resistant metal; and
   a power source electrically coupled to the heater element to resistively heat the outer, bare metal surface, and wherein heat transfers from the outer, bare metal surface to the soil.

53. The heater well of claim 52, wherein the heater element provides radiant heat directly to the soil.

54. The heater well of claim 52, wherein the heater element provides conductive heat to fill material.

55. The heater well of claim 52, wherein the heater element provides conductive heat directly to the soil.

56. The heater well of claim 55, wherein the fill material comprises catalyst to promote degradation of contaminants.

57. The heater well of claim 52, further comprising fill material adjacent to the heater element.

58. The heater well of claim 57, wherein the fill material comprises catalyst to promote degradation of contaminants.

59. The heater well of claim 52, wherein the heater element comprises a metal having self-regulating resistivity characteristics within an operating temperature range from initial ambient soil temperature to at least about 875° C.

60. The heater well of claim 52, wherein the metal comprises 304 stainless steel.

61. The heater well of claim 52, wherein the metal comprises 310 stainless steel.

62. The heater well of claim 52, wherein a portion of the bare metal surface is located within a trench.

63. The heater well of claim 52, further comprising electrically insulating spacers positioned along a length of the heater element.

64. The heater well of claim 52, wherein the heating section comprises a first section and a second section, wherein the first section dissipates more heat than the second section, wherein the first section is positioned adjacent soil having a first concentration of contaminants, wherein the second section is positioned adjacent soil having a second concentration of contaminants, and wherein the first concentration is less than about the second concentration.

* * * * *

UNITED STATES PATENT AND TRADEMARK OFFICE
CERTIFICATE OF CORRECTION

PATENT NO. : 6,632,047 B2
DATED : October 14, 2003
INVENTOR(S) : Vinegar et al.

It is certified that error appears in the above-identified patent and that said Letters Patent is hereby corrected as shown below:

<u>Column 29,</u>
Line 41, please delete "claim 27, comprising" and substitute therefor -- "claim 27, further comprising" --.

Signed and Sealed this

Fifteenth Day of June, 2004

JON W. DUDAS
*Acting Director of the United States Patent and Trademark Office*